(12) United States Patent
Li et al.

(10) Patent No.: US 12,476,768 B2
(45) Date of Patent: Nov. 18, 2025

(54) RESOURCE ALLOCATION FOR OVER-THE-AIR MODEL AGGREGATION IN FEDERATED LEARNING

(71) Applicant: QUALCOMM INCORPORATED, San Diego, CA (US)

(72) Inventors: Qiaoyu Li, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 18/002,252

(22) PCT Filed: Sep. 5, 2020

(86) PCT No.: PCT/CN2020/113635
§ 371 (c)(1),
(2) Date: Dec. 16, 2022

(87) PCT Pub. No.: WO2022/047757
PCT Pub. Date: Mar. 10, 2022

(65) Prior Publication Data
US 2023/0231690 A1    Jul. 20, 2023

(51) Int. Cl.
*H04L 5/00*    (2006.01)
*H04L 1/1822*    (2023.01)
(Continued)

(52) U.S. Cl.
CPC .......... *H04L 5/0094* (2013.01); *H04L 1/1822* (2013.01); *H04W 72/1268* (2013.01); *H04W 72/232* (2023.01); *H04W 72/566* (2023.01)

(58) Field of Classification Search
None
See application file for complete search history.

(56) References Cited

U.S. PATENT DOCUMENTS

| 10,638,513 B2 | 4/2020 | Xue et al. |
| 2015/0312016 A1 | 10/2015 | Farkas et al. |

(Continued)

FOREIGN PATENT DOCUMENTS

| CN | 103220070 A | 7/2013 |
| CN | 103442391 A | 12/2013 |

(Continued)

OTHER PUBLICATIONS

Zhu et al., "Broadband Analog Aggregation for Low-Latency Federated Edge Learning", Jan. 2020, IEEE Transactions on Wireless Communications. vol. 19, No. 1, pp. 1-16 (Year: 2020).*

(Continued)

*Primary Examiner* — Steve R Young
(74) *Attorney, Agent, or Firm* — Holland & Hart LLP

(57) ABSTRACT

Methods, systems, and devices for wireless communications are described. In some wireless communications systems, a user equipment (UE) may be configured to transmit data to a network device using an unencoded signal that includes parameters for updating a local data model. The UE may receive a radio network temporary identifier (RNTI) to decode a resource allocation message that schedules uplink resources for the transmission of the parameters, where the RNTI may be a dedicated RNTI that is different from other RNTIs received by the UE. The UE may identify allocated resources as scheduled by the resource allocation message, and may apply analog modulation and pre-equalization parameters to a data block to form an unencoded uplink transmission that includes the model parameters. The UE may transmit the unencoded uplink message in accordance with an over-the-air computation procedure.

30 Claims, 17 Drawing Sheets

(51) Int. Cl.
  *H04W 72/1268* (2023.01)
  *H04W 72/232* (2023.01)
  *H04W 72/566* (2023.01)

(56) References Cited

U.S. PATENT DOCUMENTS

| | | | |
|---|---|---|---|
| 2018/0368133 A1* | 12/2018 | Park | H04L 5/0064 |
| 2019/0268933 A1* | 8/2019 | Sun | H04W 72/0446 |
| 2019/0327755 A1 | 10/2019 | Xiong et al. | |
| 2020/0037191 A1 | 1/2020 | Jang et al. | |
| 2020/0260508 A1 | 8/2020 | He et al. | |
| 2022/0312440 A1* | 9/2022 | Bagheri | H04W 72/044 |

FOREIGN PATENT DOCUMENTS

| | | |
|---|---|---|
| CN | 106658720 A | 5/2017 |
| CN | 111133702 A | 5/2020 |
| CN | 111176929 A | 5/2020 |
| WO | WO-2019050629 | 3/2019 |
| WO | WO-2019137467 A1 | 7/2019 |

OTHER PUBLICATIONS

Amiri M.M., et al., "Machine Learning at the Wireless Edge: Distributed Stochastic Gradient Descent Over-the-Air", 2019 IEEE International Symposium on Information Theory (ISIT), IEEE, Jul. 7, 2019, XP033619970, pp. 1432-1436, Section 1, par. 1-4, Section II, par. 1-3, Section IV, par. 1-3.

Huang T., et al., "Physical-Layer Arithmetic for Federated Learning in Uplink MU-MIMO Enabled Wireless Networks", IEEE INFOCOM 2020—IEEE Conference on Computer Communications, IEEE, Jul. 6, 2020, XP033806615, pp. 1221-1230, Section I, par. 2, 3, Section II. B, par. 1, Section IV. A, par. 1, Section IV.B, par. 1.

Supplementary European Search Report—EP20952001—Search Authority—The Hague—May 13, 2024.

Yang K., et al., "Federated Learning Based on Over-the-Air Computation", ICC 2019—2019 IEEE International Conference on Communications (ICC), IEEE, May 20, 2019, XP033581935, 6 pages, Section I, par. 2, Section II. A, par.1, par. above and incl. Algorithm 1, Section II. B, par. 1, 2.

Zhu G., et al., "Broadband Analog Aggregation for Low-Latency Federated Edge Learning", IEEE Transactions on Wireless Communications, vol. 19, No. 1, pp. 491-506, Jan. 1, 2020.

International Search Report and Written Opinion—PCT/CN2020/113635—ISA/EPO—Jun. 8, 2021.

QUALCOMM: "Remaining Issues on Uplink Collision Handling and SPS for URLLC", 3GPP TSG RAN WG1 #101e, R1-2004461, May 25, 2020-Jun. 5, 2020, pp. 1-6, Jun. 5, 2020 (Jun. 5, 2020) the whole document.

* cited by examiner

RESOURCE ALLOCATION FOR OVER-THE-AIR MODEL AGGREGATION IN FEDERATED LEARNING

CROSS REFERENCE

The present Application is a 371 national stage filing of International PCT Application No. PCT/CN2020/113635 by LI et al. entitled "RESOURCE ALLOCATION FOR OVER-THE-AIR MODEL AGGREGATION IN FEDERATED LEARNING," filed Sep. 5, 2020, which is assigned to the assignee hereof, and which is expressly incorporated by reference in its entirety herein.

FIELD OF TECHNOLOGY

The following relates to wireless communications, including resource allocation for over-the-air model aggregation in federated learning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A group of UEs may be configured to update a global or general data model based on corresponding updates to local data models. In some cases, however, techniques supporting the group of UEs to transmit uplink signals to a base station or an edge server may be deficient.

SUMMARY

The described techniques relate to improved methods, systems, devices, and apparatuses that support resource allocation for over-the-air model aggregation in federated learning. In some wireless communications systems, a user equipment (UE) may be configured to transmit data to a network device (e.g., an edge server, a remote parameter server, a base station, etc.). In such systems, the transmitted data may include parameters or gradients associated with updating a local data model (e.g., an artificial intelligence or machine learning model) at the UE, and the network device may aggregate data from multiple UEs to generate a global data model. In some cases, a number of UEs may transmit data to the network device across a shared channel (e.g., a multiple access channel (MAC)) as part of an air computation procedure.

In some examples, a UE may receive an identifier (e.g., a radio network temporary identifier (RNTI)) that the UE may use to decode a resource allocation message such as a downlink control information (DCI) message that schedules uplink resources for the transmission of an unencoded uplink signal according to an air computation procedure (e.g., an uplink message indicating parameters or gradients associated with model aggregation). For example, the RNTI may be a dedicated RNTI that is different from other RNTIs received by the UE. In addition, the DCI may be an uplink-grant DCI that is specific to allocating resources for transmitting the model parameters. The UE may identify allocated resources as scheduled by the DCI (e.g., a specific physical uplink shared channel (PUSCH) or configured grant (CG) PUSCH) for the transmission of the model parameters. The UE may apply analog modulation and pre-equalization parameters to a data block to form an unencoded uplink transmission that includes the model parameters or gradients, and may transmit the unencoded uplink message in accordance with the over-the-air computation procedure.

A method of wireless communications at a first UE is described. The method may include receiving a first RNTI associated with decoding a first resource allocation message that allocates uplink resources for transmission of an unencoded uplink signal, the first RNTI being different from one or more other RNTIs configured for the UE, decoding the first resource allocation message using the first RNTI, applying analog modulation and pre-equalization parameters to a data block to form the unencoded uplink signal, where the uplink resources allocated by the first resource allocation message overlap with transmissions of one or more other UEs, and transmitting the unencoded uplink signal on the uplink resources allocated by the first resource allocation message according to an over-the-air computation operation.

An apparatus for wireless communications at a first UE is described. The apparatus may include a processor, memory coupled with the processor, and instructions stored in the memory. The instructions may be executable by the processor to cause the apparatus to receive a first RNTI associated with decoding a first resource allocation message that allocates uplink resources for transmission of an unencoded uplink signal, the first RNTI being different from one or more other RNTIs configured for the UE, decode the first resource allocation message using the first RNTI, apply analog modulation and pre-equalization parameters to a data block to form the unencoded uplink signal, where the uplink resources allocated by the first resource allocation message overlap with transmissions of one or more other UEs, and transmit the unencoded uplink signal on the uplink resources allocated by the first resource allocation message according to an over-the-air computation operation.

Another apparatus for wireless communications at a first UE is described. The apparatus may include means for receiving a first RNTI associated with decoding a first resource allocation message that allocates uplink resources for transmission of an unencoded uplink signal, the first RNTI being different from one or more other RNTIs configured for the UE, decoding the first resource allocation message using the first RNTI, applying analog modulation and pre-equalization parameters to a data block to form the unencoded uplink signal, where the uplink resources allocated by the first resource allocation message overlap with transmissions of one or more other UEs, and transmitting the unencoded uplink signal on the uplink resources allocated by the first resource allocation message according to an over-the-air computation operation.

A non-transitory computer-readable medium storing code for wireless communications at a first UE is described. The code may include instructions executable by a processor to receive a first RNTI associated with decoding a first resource allocation message that allocates uplink resources for transmission of an unencoded uplink signal, the first RNTI being different from one or more other RNTIs configured for the UE, decode the first resource allocation message using the first RNTI, apply analog modulation and pre-equalization parameters to a data block to form the unencoded uplink signal, where the uplink resources allocated by the first resource allocation message overlap with transmissions of one or more other UEs, and transmit the unencoded uplink signal on the uplink resources allocated by the first resource allocation message according to an over-the-air computation operation.

In some examples of the method, apparatuses, and non-transitory computer-readable medium described herein, decoding the first resource allocation message using the first RNTI further may include operations, features, means, or instructions for identifying dynamically allocated uplink shared channel resources based on the first resource allocation message.

In some examples of the method, apparatuses, and non-transitory computer-readable medium described herein, decoding the first resource allocation message using the first RNTI further may include operations, features, means, or instructions for identifying uplink resources allocated by a configured grant, where the first resource allocation message indicates an activation or a deactivation of the uplink resources allocated by the configured grant.

In some examples of the method, apparatuses, and non-transitory computer-readable medium described herein, transmitting the unencoded uplink signal on the uplink resources allocated by the first resource allocation message further may include operations, features, means, or instructions for transmitting the unencoded uplink signal on the uplink resources based on a priority of the unencoded uplink signal relative to other uplink signaling for the UE.

Some examples of the method, apparatuses, and non-transitory computer-readable medium described herein may further include operations, features, means, or instructions for identifying overlapping time-frequency resources for transmission of the unencoded uplink signal and the other uplink signaling, and determining that the transmission of the unencoded uplink signal may have a default lower priority than the other uplink signaling.

Some examples of the method, apparatuses, and non-transitory computer-readable medium described herein may further include operations, features, means, or instructions for receiving an indication of the priority of the unencoded uplink signal.

Some examples of the method, apparatuses, and non-transitory computer-readable medium described herein may further include operations, features, means, or instructions for determining, based on the first RNTI, that the first resource allocation message schedules a transmission of one or more repetitions of the unencoded uplink signal on one or more uplink resources of the allocated uplink resources.

In some examples of the method, apparatuses, and non-transitory computer-readable medium described herein, the first resource allocation message includes DCI, a HARQ process identification (ID), a new data indicator (NDI), or any combination thereof.

Some examples of the method, apparatuses, and non-transitory computer-readable medium described herein may further include operations, features, means, or instructions for determining that the one or more uplink resources include a number of configured grant physical uplink shared channel resources, and transmitting the one or more repetitions of the unencoded uplink signal on the number of configured grant physical uplink shared channel resources based on the resource allocation message.

Some examples of the method, apparatuses, and non-transitory computer-readable medium described herein may further include operations, features, means, or instructions for determining that the one or more uplink resources include different frequency-domain resources of a physical uplink shared channel, and transmitting the one or more repetitions on the different frequency-domain resources of the physical uplink shared channel based on the resource allocation message.

Some examples of the method, apparatuses, and non-transitory computer-readable medium described herein may further include operations, features, means, or instructions for configuring a time gap between the one or more repetitions based on a channel fading value associated with the transmission of the unencoded uplink signal.

Some examples of the method, apparatuses, and non-transitory computer-readable medium described herein may further include operations, features, means, or instructions for receiving the first resource allocation message as a DCI message or a field contained in a DCI message.

A method of wireless communications at a base station is described. The method may include transmitting, to a UE, a first RNTI associated with decoding a first resource allocation message that allocates uplink resources for a transmission of an unencoded uplink signal, the first RNTI being different from one or more other RNTIs transmitted to the UE, transmitting the first resource allocation message based on the transmission of the first RNTI, where the uplink resources allocated by the first resource allocation message include overlapping resources, and receiving the unencoded uplink signal on the uplink resources allocated by the first resource allocation message according to an over-the-air computation operation.

An apparatus for wireless communications at a base station is described. The apparatus may include a processor, memory coupled with the processor, and instructions stored in the memory. The instructions may be executable by the processor to cause the apparatus to transmit, to a UE, a first RNTI associated with decoding a first resource allocation message that allocates uplink resources for a transmission of an unencoded uplink signal, the first RNTI being different from one or more other RNTIs transmitted to the UE, transmit the first resource allocation message based on the transmission of the first RNTI, where the uplink resources allocated by the first resource allocation message include overlapping resources, and receive the unencoded uplink signal on the uplink resources allocated by the first resource allocation message according to an over-the-air computation operation.

Another apparatus for wireless communications at a base station is described. The apparatus may include means for transmitting, to a UE, a first RNTI associated with decoding a first resource allocation message that allocates uplink resources for a transmission of an unencoded uplink signal, the first RNTI being different from one or more other RNTIs transmitted to the UE, transmitting the first resource allocation message based on the transmission of the first RNTI, where the uplink resources allocated by the first resource allocation message include overlapping resources, and receiving the unencoded uplink signal on the uplink resources allocated by the first resource allocation message according to an over-the-air computation operation.

A non-transitory computer-readable medium storing code for wireless communications at a base station is described. The code may include instructions executable by a processor to transmit, to a UE, a first RNTI associated with decoding a first resource allocation message that allocates uplink resources for a transmission of an unencoded uplink signal, the first RNTI being different from one or more other RNTIs transmitted to the UE, transmit the first resource allocation message based on the transmission of the first RNTI, where the uplink resources allocated by the first resource allocation message include overlapping resources, and receive the unencoded uplink signal on the uplink resources allocated by the first resource allocation message according to an over-the-air computation operation.

In some examples of the method, apparatuses, and non-transitory computer-readable medium described herein, transmitting the first resource allocation message associated with the first RNTI further may include operations, features, means, or instructions for dynamically allocating uplink shared channel resources based on the first resource allocation message.

In some examples of the method, apparatuses, and non-transitory computer-readable medium described herein, transmitting the first resource allocation message associated with the first RNTI further may include operations, features, means, or instructions for allocating uplink resources in a configured grant, where the first resource allocation message indicates an activation or a deactivation of the uplink resources allocated by the configured grant.

In some examples of the method, apparatuses, and non-transitory computer-readable medium described herein, receiving the unencoded uplink signal on the uplink resources allocated by the first resource allocation message further may include operations, features, means, or instructions for receiving the unencoded uplink signal on the uplink resources based on a priority of the unencoded uplink signal relative to other uplink signaling for the UE.

Some examples of the method, apparatuses, and non-transitory computer-readable medium described herein may further include operations, features, means, or instructions for identifying overlapping time-frequency resources for transmission of the unencoded uplink signal and the other uplink signaling, and determining that the transmission of the unencoded uplink signal may have a default lower priority than the other uplink signaling.

Some examples of the method, apparatuses, and non-transitory computer-readable medium described herein may further include operations, features, means, or instructions for transmitting an indication of the priority of the unencoded uplink signal.

Some examples of the method, apparatuses, and non-transitory computer-readable medium described herein may further include operations, features, means, or instructions for scheduling, via the first resource allocation message, a transmission of one or more repetitions of the unencoded uplink signal on one or more uplink resources of the allocated uplink resources based on the first RNTI.

In some examples of the method, apparatuses, and non-transitory computer-readable medium described herein, the first resource allocation message includes DCI, a HARQ process identification (ID), a new data indicator (NDI), or any combination thereof.

Some examples of the method, apparatuses, and non-transitory computer-readable medium described herein may further include operations, features, means, or instructions for allocating, to the UE, one or more uplink resources as a number of configured grant physical uplink shared channel resources, and receiving the one or more repetitions of the unencoded uplink signal on the number of configured grant physical uplink shared channel resources based on the first resource allocation message.

Some examples of the method, apparatuses, and non-transitory computer-readable medium described herein may further include operations, features, means, or instructions for allocating, to the UE, one or more different frequency-domain resources of a physical uplink shared channel, and receiving the one or more repetitions on the different frequency-domain resources of the physical uplink shared channel based on the resource allocation message.

Some examples of the method, apparatuses, and non-transitory computer-readable medium described herein may further include operations, features, means, or instructions for configuring a time gap between the one or more repetitions based on a channel fading value associated with the transmission of the unencoded uplink signal.

Some examples of the method, apparatuses, and non-transitory computer-readable medium described herein may further include operations, features, means, or instructions for transmitting the first resource allocation message as a DCI message or a field contained in a DCI message.

DETAILED DESCRIPTION

Figure 1:
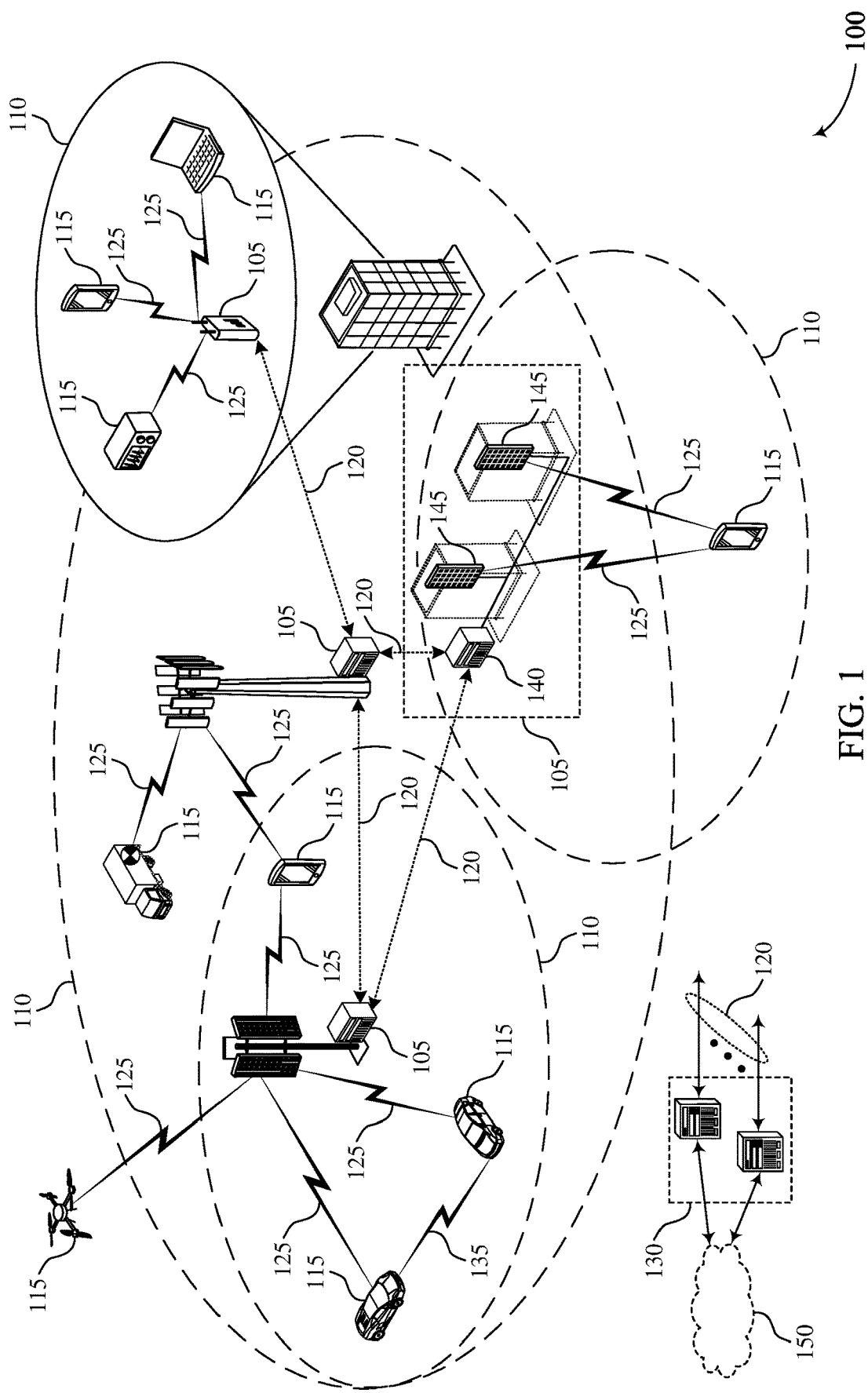
FIG. 1 illustrates an example of a system for wireless communications that supports resource allocation for over-the-air model aggregation in federated learning in accordance with aspects of the present disclosure.

In some wireless communications systems, a user equipment (UE) may be configured to transmit data to a network device (e.g., an edge server, a remote parameter server, a base station, etc.). In such systems, the transmitted data may include parameters or gradients associated with updating a local data model (e.g., an artificial intelligence or machine learning model) at the UE, and the network device may aggregate data from multiple UEs to generate a global data model. In some cases, a number of UEs may transmit data to the network device across a shared channel (e.g., a multiple access channel (MAC)) as part of an air computation procedure.

Various aspects of the present disclosure provide techniques for UEs to identify resources allocated for the transmission of unencoded uplink messages associated with model aggregation in the context of over-the-air computation, federated learning, distributed computation, or large datasets. A UE may receive a radio network temporary identifier (RNTI) that may allow the UE to decode a resource allocation message (e.g., control signaling such as a DCI) that schedules uplink resources for the transmission of parameters or gradients associated with model aggregation (or other uplink messages as part of an over the air computation operation). For example, the RNTI may be a dedicated RNTI that is different from other RNTIs received by the UE, such that the RNTI may specifically indicate that the UE is to monitor for a DCI that schedules resources for transmission of the model parameters or gradients. In addition, the DCI may be an uplink-grant DCI that is specific to allocating resources for transmitting the model parameters (e.g., different from other DCIs that the UE may receive). The UE may identify allocated resources as scheduled by the DCI (e.g., a specific PUSCH or configured grant (CG) PUSCH) for the transmission of the model parameters, and may transmit the model parameters in an unencoded uplink message in accordance with the over-the-air computation procedure.

In some examples, the UE may identify different priorities associated with transmissions of model parameters using the allocated uplink resources indicated in the DCI. In some examples, the UE may determine the priority of the transmission of the model parameters in the allocated PUSCH based on overlapping transmissions in the channel. In some other implementations, the DCI may schedule the UE to transmit repeated parameters or gradients for model aggregation over multiple scheduled PUSCHs, which may reduce instantaneous deep fading of the wireless channel.

Resource allocation techniques described herein, such as those that include specified RNTI and DCI for resource scheduling, may allow for efficient resource usage in shared channels used in over-the-air aggregation, which may reduce communication latency and improve system performance.

Aspects of the disclosure are initially described in the context of wireless communications systems. Aspects of the disclosure are then described with reference to an over-the-air computation technique, a federated learning technique, and a process flow. Aspects of the disclosure are further illustrated by and described with reference to apparatus diagrams, system diagrams, and flowcharts that relate to resource allocation for over-the-air model aggregation in federated learning.

FIG. 1 illustrates an example of a wireless communications system 100 that supports resource allocation for over-the-air model aggregation in federated learning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a UE 115 may be configured to transmit data in an uplink message (e.g., an unencoded uplink signal) to a network device (e.g., an edge server, a remote parameter server, a base station 105, etc.) in coordination with other UEs 115 on overlapping time-frequency resources according to an over the air computation procedure. In such systems, the transmitted data may include parameters or gradients associated with updating a local data model (e.g., an artificial intelligence or machine learning model) at the UE 115, and the network device may aggregate data from multiple UEs 115 to generate a global data model. In some cases, a number of UEs 115 may transmit data to the network device across a shared channel (e.g., a multiple access channel (MAC)) as part of an air computation procedure.

In some examples, a UE 115 may identify resources allocated for the transmission of unencoded uplink messages associated with model aggregation in the context of over-the-air computation, federated learning, distributed computation, or large datasets. A UE may receive a RNTI that the UE may use to decode a resource allocation message such as a DCI that schedules uplink resources for the transmission of parameters or gradients associated with model aggregation. For example, the RNTI may be a dedicated RNTI that is different from other RNTIs received by the UE 115. In addition, the DCI may be an uplink-grant DCI that is specific to allocating resources for transmitting the model parameters (e.g., different from other DCIs that the UE 115 may receive). The UE may identify allocated resources as scheduled by the DCI (e.g., a specific PUSCH or configured grant (CG) PUSCH) for the transmission of the model parameters, and may transmit the model parameters in an unencoded uplink message in accordance with the over-the-air computation procedure.

Each UE 115 of a plurality of UEs 115 may train a local neural network based on a local dataset and transmit parameters or gradients of the local neural network to a base station 105 as part of a distributed learning process (e.g., federated learning, federated edge learning). The parameters or gradients may be signaled to the base station 105 across a shared channel (e.g., a MAC) via concurrent analog transmissions to take advantage of the signal-superposition property of the shared channel. Leveraging the signal-superposition property of the shared channel may constitute an over-the-air computation procedure, which may support the base station 105 in efficiently aggregating or averaging the signaled parameters or gradients. The base station 105 may update a global neural network (e.g., a general neural network) based on the aggregated or averaged parameters or gradients, and the base station 105 may broadcast an indication of the updated model to the plurality of UEs 115 for further training.

This process of training neural networks at UEs 115, transmitting parameters or gradients of the neural networks to the base station 105, and receiving an indication of an updated global model from the base station 105 may be considered a communication round. Communication rounds may continue until the base station 105 determines that the global model converges (e.g., the loss of the global model approaches a minima with a decreasing trend), and the base station 105 may refrain from broadcasting an indication of the updated model to the plurality of UEs 115 based on determining that the global model has converged. Performing a distributed learning process may improve data security and privacy, as UEs 115 may transmit neural network parameters or gradients to a base station 105 instead of raw data. Additionally, an over-the-air computation procedure for concurrent analog transmissions may harness the signal-superposition property of a shared channel, thereby improving system efficiency.

Figure 2:
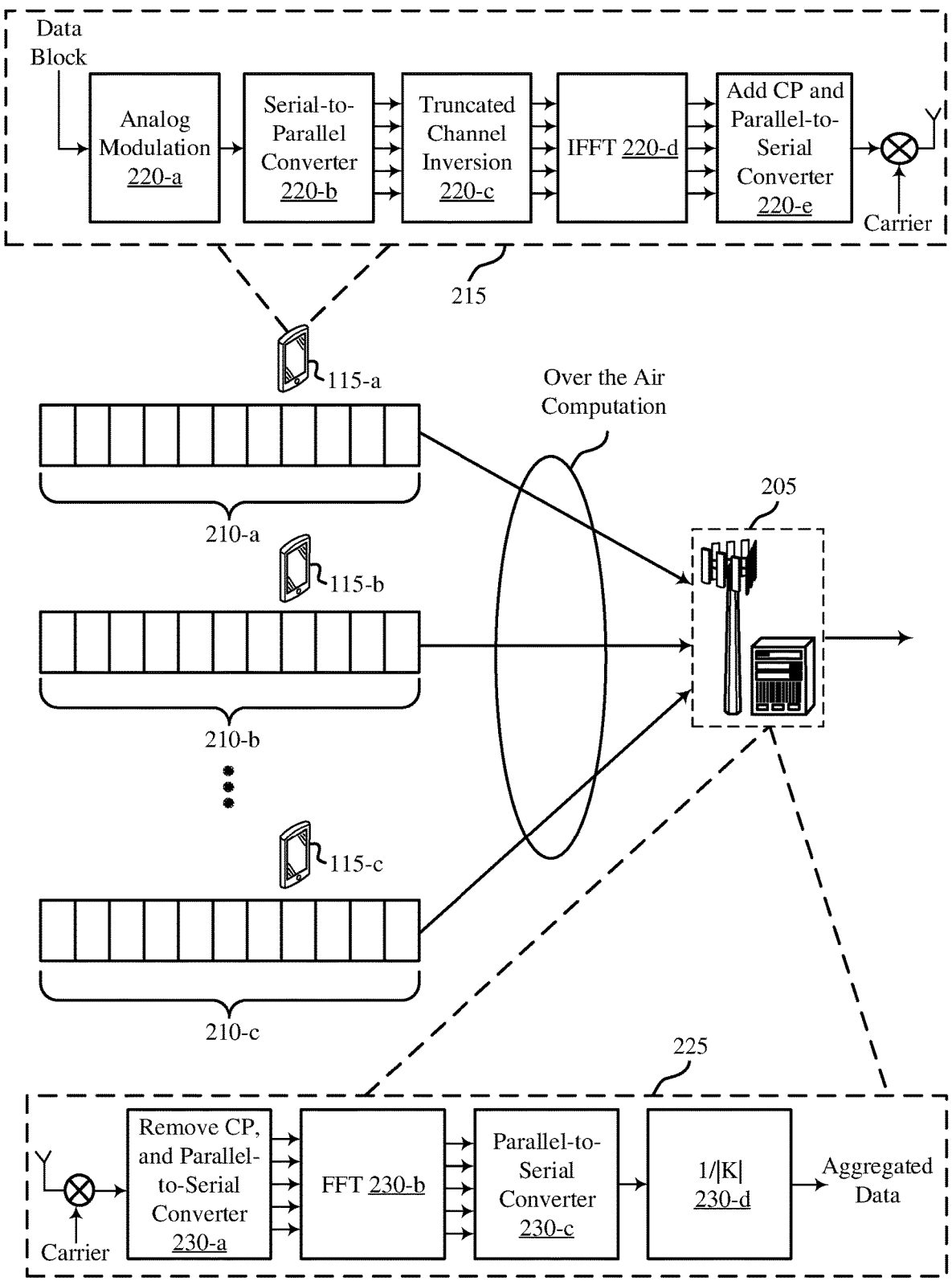
FIG. 2 illustrates an example of an over-the-air computation techniques that supports resource allocation for over-the-air model aggregation in federated learning in accordance with aspects of the present disclosure.

FIG. 2 illustrates an example of an over-the-air computation technique 200 that supports resource allocation for over-the-air model aggregation in federated learning in accordance with aspects of the present disclosure. In some examples, over-the-air computation technique 200 may implement aspects of wireless communication system 100. For example, the over-the-air computation technique 200 may include a network device 205 (e.g., a base station, an edge server, a remote parameter server, etc.), which may be an example of a base station 105 as described with reference to FIG. 1. Over-the-air computation technique 200 may further include UE 115-a, UE 115-b, and UE 115-c, which may be examples of UEs 115 as described with reference to FIG. 1.

In some wireless communications systems, a number of UEs 115 (e.g., UE 115-a, UE 115-b, and UE 115-c) may transmit data to the network device 205 in accordance with the transmitter design 215. The transmitter design 215 may apply analog modulation and pre-equalization to a data block to form an unencoded uplink signal, and the unencoded uplink signal may be transmitted to the network device 205 across a shared channel (e.g., a multiple access channel). Transmitting unencoded uplink signals across a shared channel may support over-the-air computation, which may reduce data transmission latency and decrease the amount of radio resources consumed for the transmission of the unencoded signals.

UE 115-*a* may be associated with radio resources 210-*a*, UE 115-*b* may be associated with radio resources 210-*b*, and UE 115-*c* may be associated with radio resources 210-*c*. The radio resources 210-*a*, 210-*b*, and 210-*c* may partially or fully overlap (e.g., may correspond to the same time and frequency resources) and may correspond to a multiple access or shared channel. The UEs 115 may apply pre-equalization parameters (e.g., channel inversion coefficients, transmit power scaling) to the unencoded uplink signal to improve signal characteristics (e.g., the received signal power at the network device 205, the signal-to-noise ratio, etc.), which may improve the efficiency of aggregating and/or averaging the data received at the network device 205.

A UE 115-*a* may process a data block in accordance with the transmitter design 215. The transmitter design 215 may apply analog modulation (e.g., analog amplitude modulation) to a data block at 220-*a*, perform serial-to-parallel conversion at 220-*b*, perform truncated channel inversion at 220-*c*, perform inversion Fast Fourier Transformation (IFFT) at 220-*a*, add a cyclic prefix (CP) and perform parallel-to-serial conversion at 220-*e*, and the resulting data may be transmitted to the network device via a carrier (e.g., a multiple access channel). In some cases, the UEs 115 may transmit parameters or gradients of a local data model (e.g., a neural network) to the network device 205 containing a global model, however such techniques may also be applicable to other scenarios such as distributed sensor measurements, among others.

A network device 205 may process a superimposed waveform according to the receiver design 225. For example, the superimposed waveform may be associated with waveforms transmitted by each of the UEs 115 over the shared channel to the network device 205. The network device 205 may remove the CP and perform parallel-to-serial conversion at 230-*a*, perform Fast Fourier Transformation (FFT) at 230-*b*, perform parallel-to-serial conversion at 230-*c*, and may average the aggregate parameters or gradients (e.g., divide the aggregate parameters and/or gradients by the number of UEs 115 (e.g., K)) at 230-*d*. As such, the network device 205 may receive one or more aggregate values (e.g., aggregate parameters, aggregate edge weights, aggregate gradients, etc.) corresponding to the aggregation of values from the UEs 115 and average the aggregate values by diving the aggregate values by the number of UEs 115 transmitting data (e.g., parameters and/or gradients) on the shared channel. The network device 205 may update parameters or gradients of a global data model based on the aggregate or average values indicating updates to local models at the UEs 115, and may transmit (e.g., broadcast) the updated parameters and/or gradients to the UEs 115.

A network device 205 may configure a UE 115 to identify or determine one or more parameters related to the processing or transmission of the unencoded uplink signal (e.g., a plurality of channel inversion coefficients). For example, the network device 205 may transmit a control message (e.g., an RRC message, a MAC-CE, a DCI, etc.) to the UE 115, and the control message may configure the UE 115 to determine the plurality of channel inversion coefficients. In some cases, the UE 115 may determine the plurality of channel inversion coefficients based on a reference signal (e.g., a CSI-RS, an SSB-index, etc.). In some examples, the UE 115-*a* may identify the refence signal based on a transmission configuration indicator (TCI)-state indication of an uplink grant scheduling the unencoded uplink signal (e.g., a PUSCH transmitting the over-the-air computation signal). In some examples, the unencoded uplink signal may be based on a configured grant (CG)-PUSCH and the UE 115 may identify the reference signal based on an RRC message or other control signaling.

In some cases, the UEs 115 may identify resources to use to send the unencoded uplink signal based on specific control singling. For example, the UEs 115 may identify a number of resources of a PUSCH via a specific DCI or a field of a DCI received from the network device 205. The UEs 115 may receive an identifier message such as an RNTI that the UEs 115 may use to decode the specific DCI message containing the resource allocation for transmission of the unencoded message. In some cases, the RNTI may be a dedicated RNTI that is different from other RNTIs received by the UEs 115 (e.g., the RNTI may be configured to specifically notify the UEs of the DCI that schedules the PUSCH for transmitting the unencode message). The UEs 115 may identify allocated resources (e.g., a specific PUSCH or a CG PUSCH) for the transmission of the model parameters in the unencoded uplink message. In addition, the DCI may include various other parameters associated with local model aggregation for over-the-air computation such that the UEs 115 may transmit the model parameters on overlapping resources of the PUSCH to the network device 205.

In some cases, over-the-air computation used to aggregate parameters or gradients of local models using overlapping radio resources may reduce the amount of consumed radio resources. For example, the allocation of a specific RNTI and DCI for scheduling the transmissions of unencoded uplink signals in over-the-air computation may allow the wireless communications network to more efficiently allocate and use resources.

Figure 3:
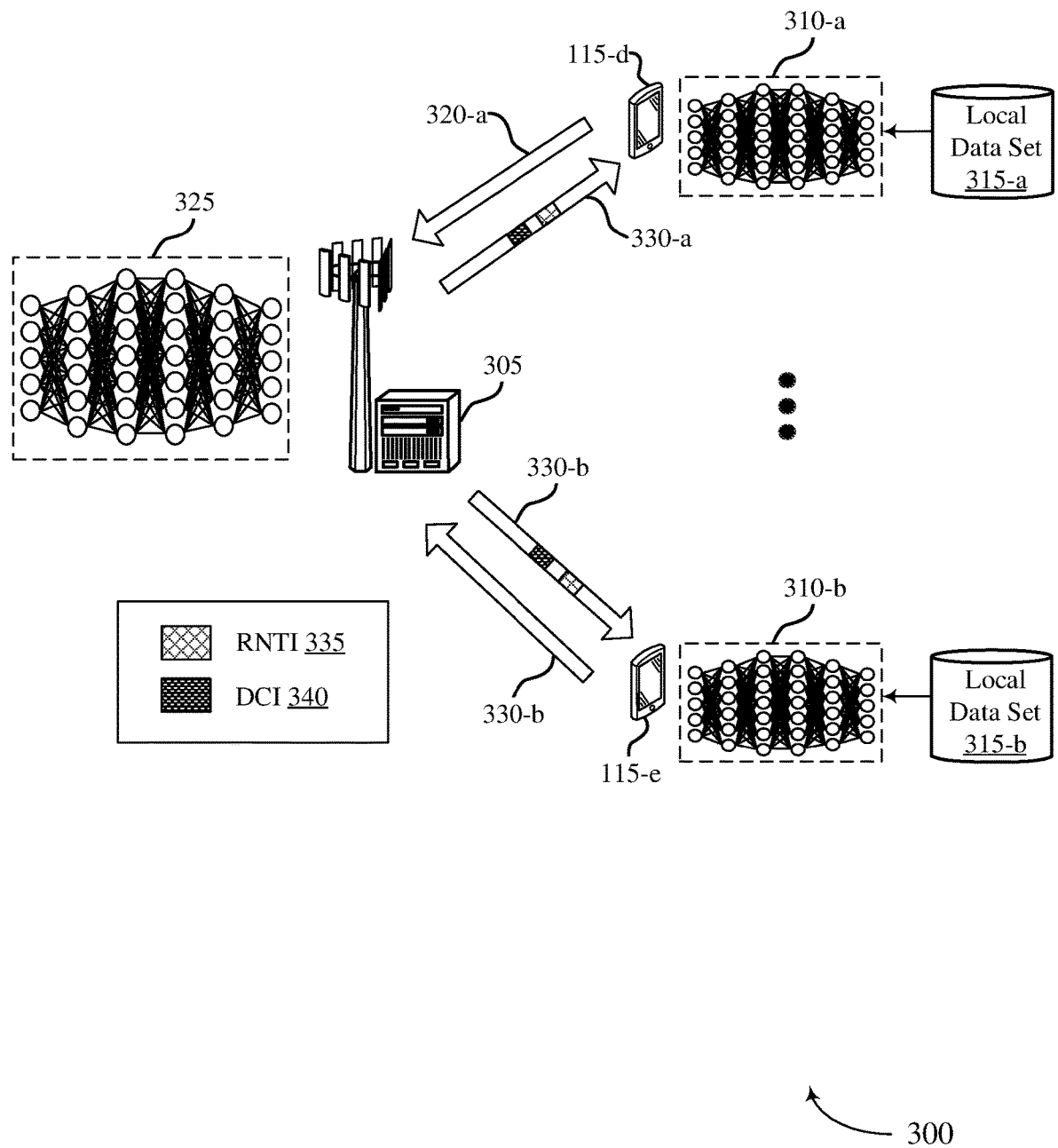
FIG. 3 illustrates an example of a federated learning technique that supports resource allocation for over-the-air model aggregation in federated learning in accordance with aspects of the present disclosure.

FIG. 3 illustrates an example of a federated learning technique 300 that supports resource allocation for over-the-air model aggregation in federated learning in accordance with aspects of the present disclosure. In some examples, federated learning technique 300 may implement aspects of wireless communication system 100. The federated learning technique 300 may include UE 115-*d*, UE 115-*e*, and base station 305, which may be examples of UEs 115 and a base station 105 as described with reference to FIG. 1.

The federated learning technique 300 may support updating a global data model 325 based on a plurality of local data models 310. In some cases, a data model may correspond to a neural network, and a global data model may correspond to a general data model. UE 115-*d* may generate local data model 310-*a* based on local data set 315-*a* and transmit a set of parameters or gradients corresponding to local data model 310-*a* across a multiple access channel 320-*a* to the base station 305. UE 115-*e* may generate local data model 310-*b* based on local data set 315-*b* and transmit a set of parameters or gradients corresponding to local data model 310-*b* across the multiple access channel 320-*b* to the base station 305. UE 115-*d* and UE 115-*e* may modulate the sets of parameters or gradients into a sequence of symbols, divide the sequence of symbols into data blocks, and transmit each data block across the multiple access channel 320 in an OFDM symbol, where one parameter or gradient is transmitted across a subchannel of the multiple access channel 320 during the OFDM symbol.

The base station 305 may receive a set of aggregate parameters or aggregate gradients corresponding to the parameters or gradients of the local models 310. The base station 305 may calculate a set of average parameters or average gradients, update the global model with the set of average parameters or average gradients, and broadcast the updated parameters or gradients of the global model 325 to the UEs 115 via broadcast channel 330-*a* and 330-*b*. In some cases, the UEs 115 may train the local models 310 and determine the local parameters or gradients based on receiving a training indication from the base station 305.

In some cases, over-the-air computation techniques used to aggregate parameters or gradients of local models may be performed such that the UEs 115 transmit the parameters or gradients using overlapping radio resources, which may reduce the amount of consumed radio resources used for model aggregation. In such cases the base station 305 may identify set of resources that the UEs 115 may use for transmitting such model parameters or gradients. For example, the base station 305 may identify a number of resources of a physical uplink shared channel (PUSCH) corresponding to a PHY-MAC interface to support the over-the-air computation.

To notify the UEs 115 of the allocated resources for sending the model parameters or model gradients, the base station may send an RNTI 335 that the UEs 115 may use to decode a UE-specific or group specific DCI message 340 containing the resource allocation. In some cases, the RNTI 335 may be a dedicated RNTI that is different from other RNTIs received by the UEs 115 (e.g., the RNTI 335 may be specific to notifying the UEs of the DCI 340). The DCI 340 may be an uplink-grant DCI that is specific to allocating resources for transmitting the model parameters. The UEs 115 may identify allocated resources (e.g., a specific PUSCH or configured grant (CG) PUSCH) for the transmission of the model parameters. Additionally, the DCI 340 may include various other parameters associated with model aggregation such that the UEs 115 may transmit the model parameters on overlapping resources of the PUSCH.

In some examples, the DCI 340 may indicate resources of a CG-PUSCH for transmission, and the UEs 115 may store the CG-PUSCH for use according to a pre-configured timing indicated by the configured grant. In some cases, the DCI 340 may activate or deactivate the CG-PUSCH for use to transmit the model parameters or gradients. For example, UEs 115 may receive a RNTI 335 for decoding the DCI 340, which indicates that CG-PUSCH is activated. In such cases, the UEs 115 may use configured resources of the CG-PUSCH to transmit model parameters or gradients based on the activation indicated in the DCI 340. In some other examples, the DCI 340 may indicate that the CG-PUSCH is deactivated, and the UEs 115 may refrain from using the configured resources of the CG-PUSCH.

In some examples, the RNTI 335 may indicate a DCI 340 that is a DCI specific to scheduling resources for transmitting the model parameters or gradients. In some other cases, the RNTI 335 may indicate a field in an existing DCI, where the field indicates resources allocated for the transmission of the model parameters or gradients.

Based on receiving the RNTI 335 and DCI 340, the UEs 115 may identify different priorities associated with transmissions of model parameters using the allocated uplink resources indicated in the DCI 340. In some examples, the UEs 115 may determine that the transmission of the model parameters in an allocated PUSCH may overlap (e.g., in the time domain or frequency domain) with other uplink transmissions in the channel. In such cases of overlap, the UEs 115 may determine that the PUSCH scheduled for transmission of the model parameters or gradients is lower priority than the other uplink transmissions based on the determined overlap. In some other examples, the priority of the PUSCH for transmitting the model parameters or gradients may be configured or indicated (e.g., via signaling from the base station 305). For example, the UEs 115 may receive control signaling (e.g., via RRC, DCI, etc.) from the base station 305 that indicates that the PUSCH for transmitting the model parameters or gradients has a lower or higher priority than other uplink transmissions scheduled for the wireless channel. In some cases, the base station 305 may dynamically indicate the priority to the UEs 115 based on system parameters such as channel traffic, message type or type of data transmitted, latency or reliability targets, etc.

In some implementations, a wireless communications network may employ techniques such as transmission repetition or other frequency diversity techniques to mitigate channel fading due to shared channel transmissions from UEs 115. For example, in some cases, the DCI 340 may schedule the UEs 115 to transmit repeated parameters or gradients for model aggregation over multiple scheduled PUSCHs, which may reduce instantaneous deep fading. In such examples, multiple UEs 115 (e.g., UE 115-*d* and UE 115-*e*) may transmit repetitions over the same PUSCH resources as scheduled by the DCI 340.

The UEs 115 may be scheduled to transmit repetitions via the scheduled PUSCH in the time domain using time domain resources, or the UE 115 may transmit repetitions using different frequency domain resources for the same PUSCH. In addition, the base station 305 or the UEs 115 may configure transmissions of the repetitions to be long enough such that deep channel fading is reduced.

In some cases, the repetitions may be indicated in the DCI 340 (e.g., for dynamic scheduled PUSCH). In addition, the repetitions may be indicated using a HARQ-process-ID and a new data indicator (NDI), or a redundancy version (RV) associated with a previous transmission. In one example, a UE may transmit a PUSCH with a first HARQ process ID and a NDI equal to 1, and may receive an uplink grant DCI that has the same HARQ-process-ID as the previous PUSCH transmission and NDI=0. Based on receiving the uplink grant having the same process ID as the previous PUSCH and corresponding null NDI, the UE may transmit a repetition of the previous PUSCH.

In some other cases, for example, for transmissions scheduled using CG-PUSCH, the base station 305 may configure multiple CG-PUSCHs associated with different transmission times. Based on the DCI 340 that indicates the CG-PUSCH, the UEs 115 may transmit the parameters or gradients are over the different CG-PUSCHs in accordance with the different transmission instances indicated for each CG-PUSCH (e.g., transmissions occur in a round-robin fashion in accordance with the different scheduled CG-PUSCHs).

Figure 4:
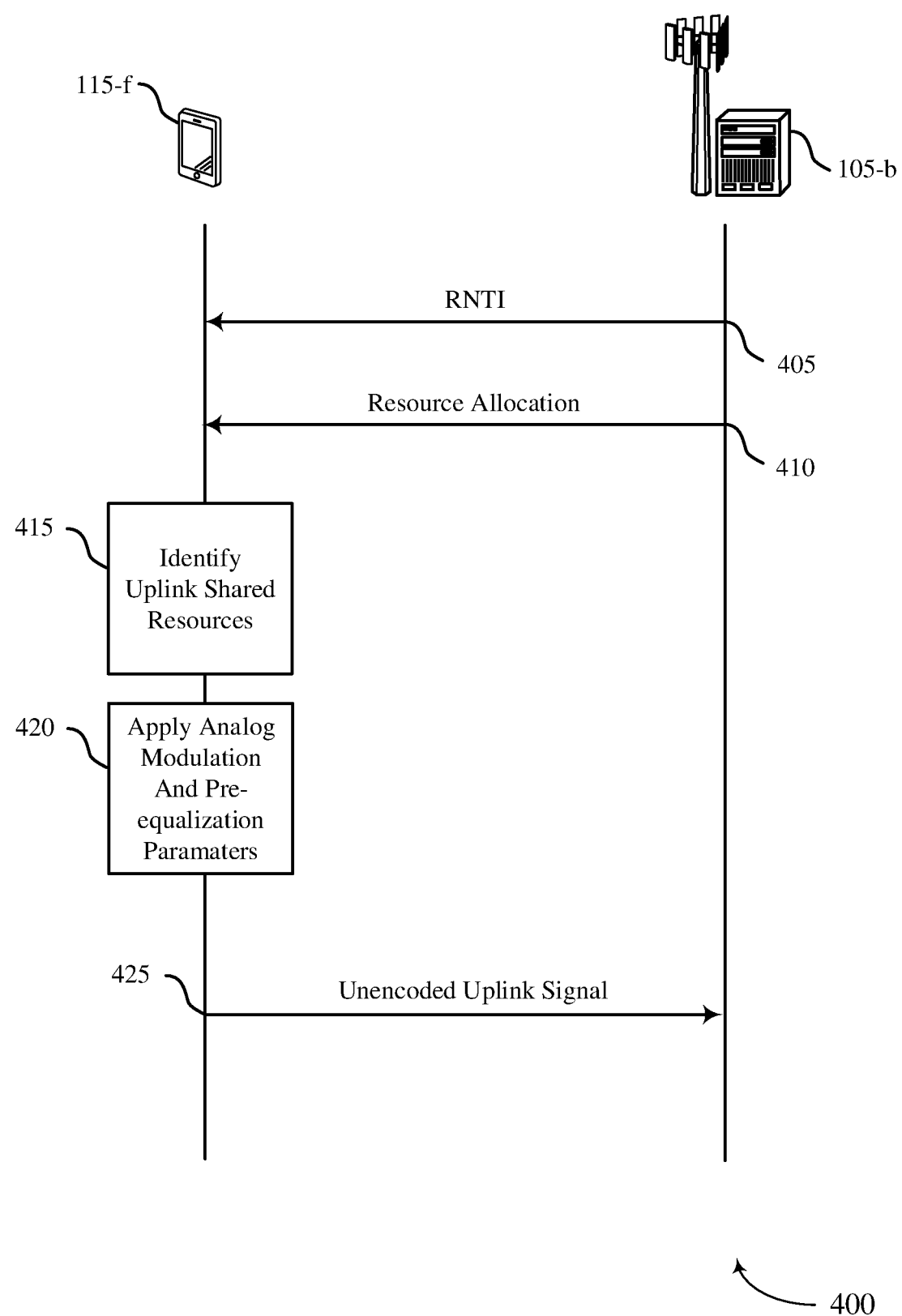
FIG. 4 illustrates an example of a process flow that supports resource allocation for over-the-air model aggregation in federated learning in accordance with aspects of the present disclosure.

FIG. 4 illustrates an example of a process flow 400 that supports resource allocation for over-the-air model aggregation in federated learning in accordance with aspects of the present disclosure. In some examples, process flow 400 may implement aspects of wireless communication system 100. The process flow 400 includes UE 115-*f* and base station 105-*b* (e.g., which may be examples of the corresponding devices described with reference to FIGS. 1 through 3). Base station 105-*b* may configure UE 115-*f* for over-the-air computation, which may decrease latency, reduce radio resource usage, and increase data privacy. Alternative examples of the following may be implemented, where some steps are performed in a different order than described or are not performed at all. In some cases, steps may include additional features not mentioned below, or further steps may be added. In addition, while process flow 400 shows processes between base station 105-*b* and a single UE 115-*f*, it should be understood that these processes may occur between any number of network devices.

At 405, base station 105-*b* (e.g., an edge server, a remote parameter server, a base station, etc.) may transmit, and the UE 115-*f* may receive, a first RNTI associated with decoding a first resource allocation message that allocates uplink resources for transmission of an unencoded uplink signal. For example, the first resource allocation message may be a DCI message or a field contained in a DCI message. In some examples, the first RNTI may be different from other RNTIs received by UE 115-*f* (e.g., the first RNTI may be specific to receiving and decoding the first resource allocation message).

At 410, the base station 105-*b* may transmit the resource allocation message to the UE 115-*f*, and the UE 115-*f* may decode the resource allocation message. The UE 115-*f* may use the first RNTI to decode the resource allocation message. In some examples, the UE 115-*f* may identify and decode the resource allocation message based on receipt of the first RNTI (e.g., the resource allocation message is specific to the first RNTI).

At 415, the UE 115-*f* may identify dynamically allocated uplink shared channel resources (e.g., PUSCH resources) based on decoding the resource allocation message. In some examples, the resource allocation message may be configured to specifically indicate the dynamically allocated uplink shared channel resources. In some other examples, the UE 115-*f* may determine that the uplink resources are allocated by a configured grant (e.g., CG-PUSCH resources). In such examples, the resource allocation message may indicate an activation or a deactivation of the uplink resources that are allocated by the configured grant. For example, in cases where the UE 115-*f* determines that the configured grant resources are activated, the UE 115-*f* may use the resources for transmissions in accordance with the resource allocation message, and in cases where the UE 115-*f* determines that the configured grant resource are deactivated, the UE 115-*f* may not use the allocated resources for transmissions.

At 420, the UE 115-*f* may apply analog modulation (e.g., analog amplitude modulation) and pre-equalization parameters to a data block to form the unencoded uplink signal. In some cases, the uplink resources allocated by the first resource allocation message overlap with transmissions of one or more other UEs based on the analog modulation and pre-equalization parameters.

At 425, the UE 115-*f* may transmit, and the base station 105-*b* may receive, the unencoded uplink signal on the uplink resources allocated by the first resource allocation message according to an over-the-air computation operation (e.g., using overlapping time-frequency resources). In some cases, the UE 115-*f* may identify a priority of the unencoded uplink signal relative to other uplink signaling for the UE 115-*f*, and may transmit the unencoded uplink signal on the uplink resources based at least in part on the priority. For example, the UE 115-*f* may identify the priority by identifying overlapping time-frequency resources for transmission of the unencoded uplink signal and the other uplink signaling, and may determine that the transmission of the unencoded uplink signal has a default lower priority than the other uplink signaling. In some other examples, the UE 115-*f* may receive an indication of the priority of the unencoded uplink signal via signaling from the base station 105-*b*.

In some examples, the UE 115-*f* may determine, based on the first identifier, that the first resource allocation message schedules a transmission of one or more repetitions of the unencoded uplink signal on one or more uplink resources of the allocated uplink resources, and UE 115-*f* may transmit a number of repetitions of the unencoded uplink signal using resources scheduled via the first resource allocation message. The UE 115-*f* may configure a time gap between the number of repetitions based on a channel fading value associated with the transmission of the unencoded uplink signal.

In addition, the repetitions may be indicated using a HARQ-process-ID and a NDI, or a redundancy version (RV) associated with a previous transmission on the uplink resources. In one example, UE 115-*f* may transmit a PUSCH with a first HARQ process ID and a NDI equal to 1, and may receive an resource allocation message that has the same HARQ-process-ID as the previous uplink transmission with NDI=0. Based on receiving the uplink grant having the same process ID as the previous uplink resource and corresponding null NDI, the UE 115-*f* may transmit a repetition of the unencoded uplink signal.

In some examples, the UE 115-*f* may determine that the one or more uplink resources include a number of CG-PUSCH resources, and the UE 115-*f* may transmit the one or more repetitions of the unencoded uplink signal on the CG-PUSCH based on the resource allocation message. In some cases, the UE 115-*f* may determine that the one or more uplink resources are different frequency-domain resources of a PUSCH, and the UE 115-*f* may transmit the one or more repetitions on the different frequency-domain resources of the PUSCH based one the resource allocation message.

Figure 5:
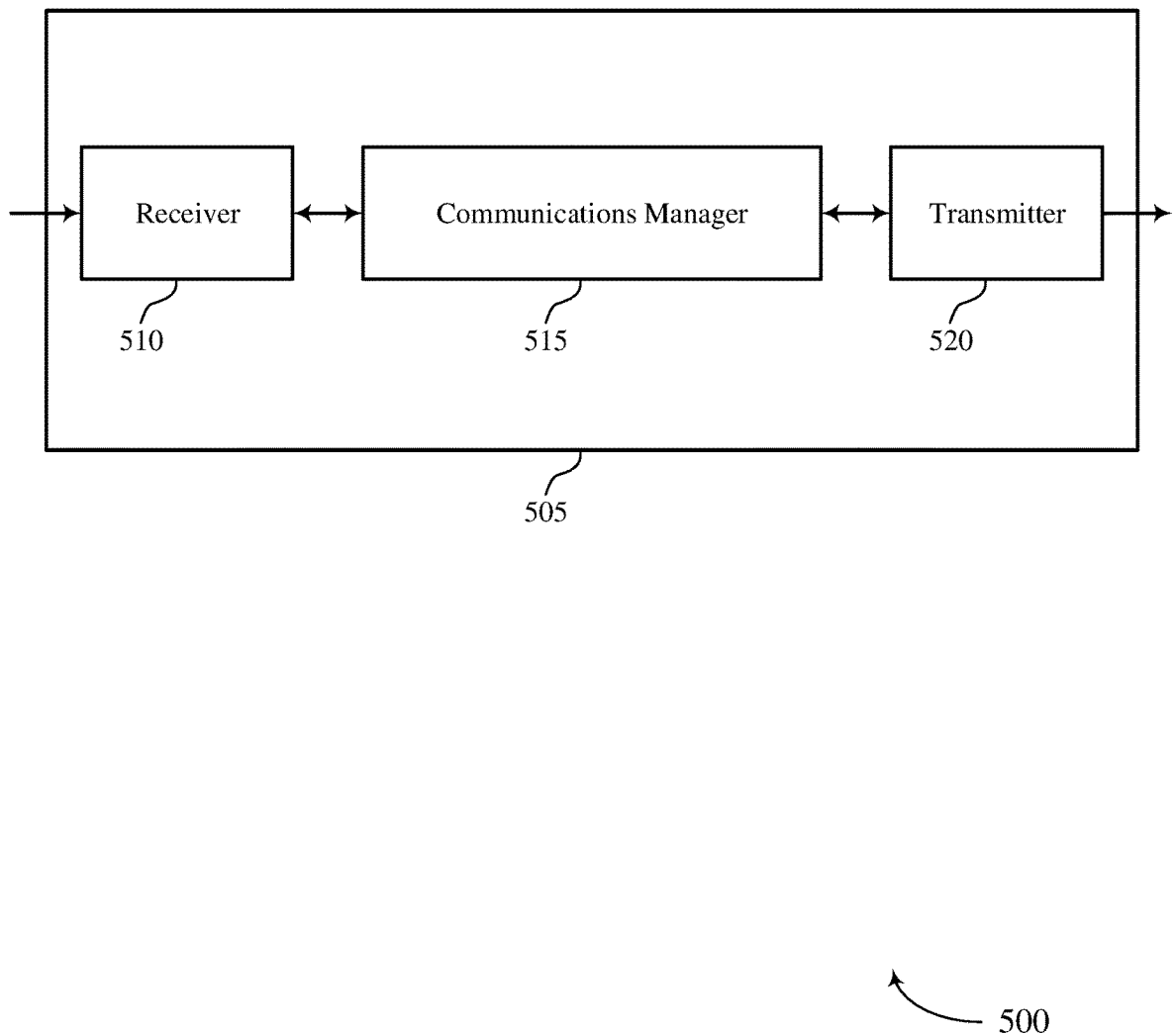
FIGS. 5 and 6 show block diagrams of devices that support resource allocation for over-the-air model aggregation in federated learning in accordance with aspects of the present disclosure.

FIG. 5 shows a block diagram 500 of a device 505 that supports resource allocation for over-the-air model aggregation in federated learning in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource allocation for over-the-air model aggregation in federated learning, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a first radio network temporary identifier (RNTI) associated with decoding a first resource allocation message that allocates uplink resources for transmission of an unencoded uplink signal, the first RNTI being different from one or more other RNTIs configured for the UE, decode the first resource allocation message using the first RNTI, apply analog modulation and pre-equalization parameters to a data block to form the unencoded uplink signal, where the uplink resources allocated by the first resource allocation message overlap with transmissions of one or more other UEs, and transmit the unencoded uplink signal on the uplink resources allocated by the first resource allocation message according to an over-the-air computation operation. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, and antennas) coupled with the mobile device modem to enable wireless transmission and reception.

The communications manager 515 as described herein may be implemented to realize one or more potential advantages. At least one implementation may enable communications manager 515 to effectively identify resources for transmission of federated learning model parameters or gradients from a device 505. In some other implementations, the communications manager 515 may determine the priority of such model parameter transmissions, along with other frequency diversity techniques to reduce channel fading for shared channels supporting unencoded signaling.

Based on implementing the rateless encoding techniques as described herein, one or more processors of the device 505 (e.g., processor(s) controlling or incorporated with one or more of receiver 510, communications manager 515, and transmitter 520) may increase the throughput and reduce the latency associated with coordinated uplink transmissions by multiple UEs in the context of over-the-air computation operations. The increase in communication quality and data throughput may result in increased link performance due to the resource allocation techniques.

Figure 6:
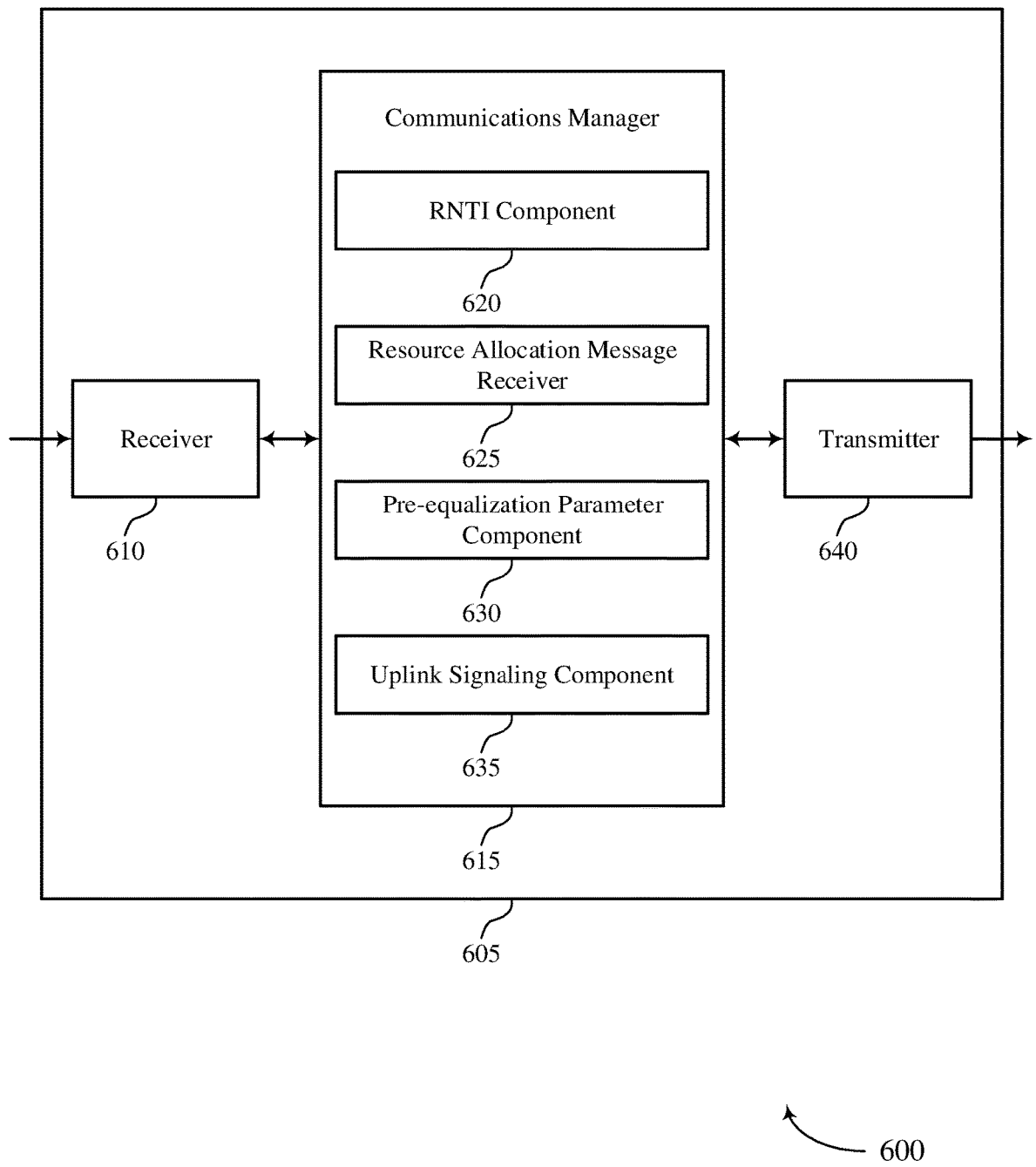

FIG. 6 shows a block diagram 600 of a device 605 that supports resource allocation for over-the-air model aggregation in federated learning in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to resource allocation for over-the-air model aggregation in federated learning, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a RNTI component 620, a resource allocation message receiver 625, a pre-equalization parameter component 630, and an uplink signaling component 635. The communications manager 615 may be an example of aspects of the communications manager 810 described herein.

The RNTI component 620 may receive a first radio network temporary identifier (RNTI) associated with decoding a first resource allocation message that allocates uplink resources for transmission of an unencoded uplink signal, the first RNTI being different from one or more other RNTIs configured for the UE. The resource allocation message receiver 625 may decode the first resource allocation message using the first RNTI.

The pre-equalization parameter component 630 may apply analog modulation and pre-equalization parameters to a data block to form the unencoded uplink signal, where the uplink resources allocated by the first resource allocation message overlap with transmissions of one or more other UEs. The uplink signaling component 635 may transmit the unencoded uplink signal on the uplink resources allocated by the first resource allocation message according to an over-the-air computation operation.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
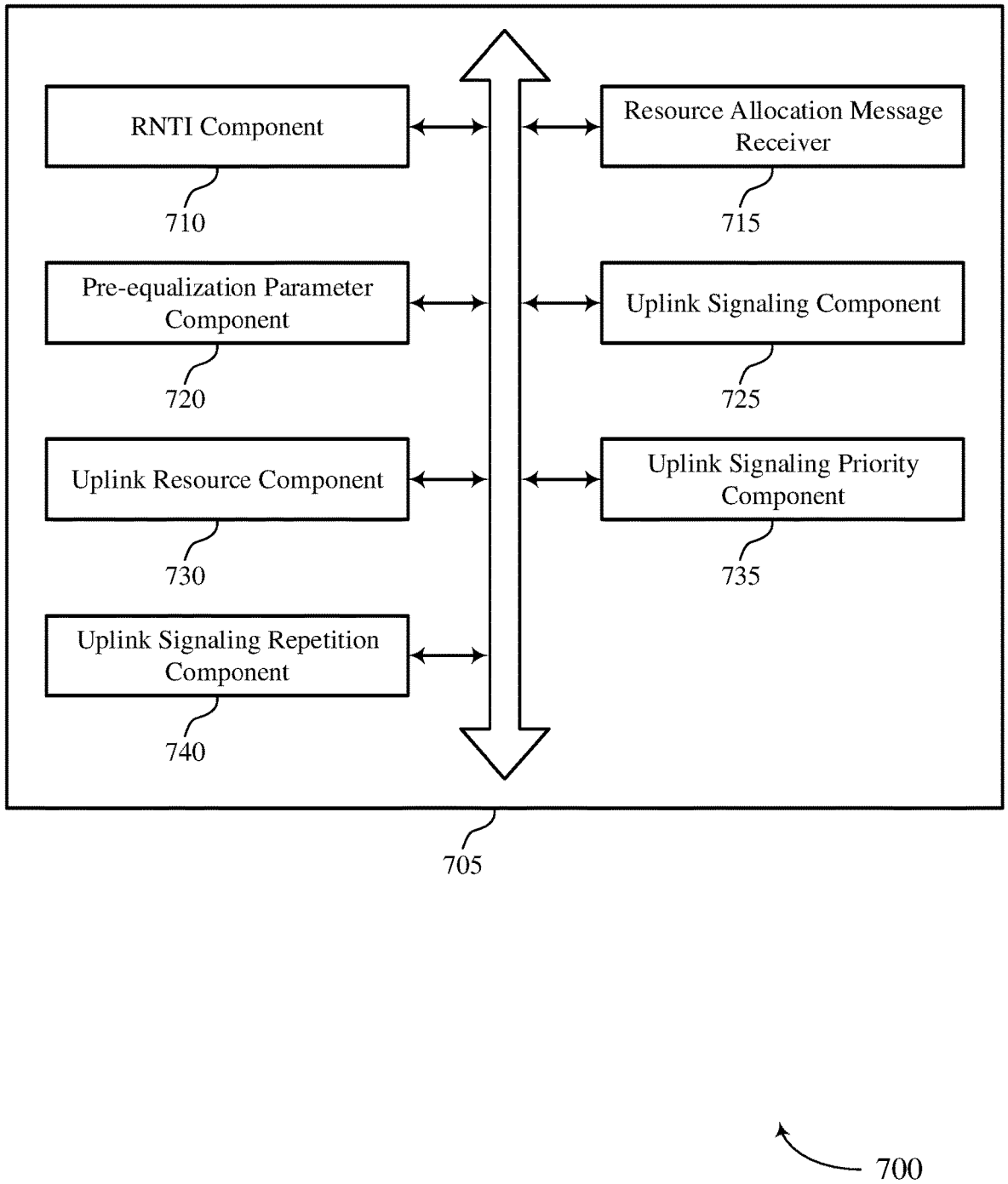
FIG. 7 shows a block diagram of a communications manager that supports resource allocation for over-the-air model aggregation in federated learning in accordance with aspects of the present disclosure.

FIG. 7 shows a block diagram 700 of a communications manager 705 that supports resource allocation for over-the-air model aggregation in federated learning in accordance with aspects of the present disclosure. The communications manager 705 may be an example of aspects of a communications manager 515, a communications manager 615, or a communications manager 810 described herein. The communications manager 705 may include a RNTI component 710, a resource allocation message receiver 715, a pre-equalization parameter component 720, an uplink signaling component 725, an uplink resource component 730, an uplink signaling priority component 735, and an uplink signaling repetition component 740. Each of these modules may communicate, directly or indirectly, with one another (e.g., via one or more buses).

The RNTI component 710 may receive a first radio network temporary identifier (RNTI) associated with decoding a first resource allocation message that allocates uplink resources for transmission of an unencoded uplink signal, the first RNTI being different from one or more other RNTIs configured for the UE. The uplink resource component 730 may identify dynamically allocated uplink shared channel resources based on the first resource allocation message.

The resource allocation message receiver 715 may decode the first resource allocation message using the first RNTI. In some examples, the resource allocation message receiver 715 may receive the first resource allocation message as a DCI message or a field contained in a DCI message.

The pre-equalization parameter component 720 may apply analog modulation and pre-equalization parameters to a data block to form the unencoded uplink signal, where the uplink resources allocated by the first resource allocation message overlap with transmissions of one or more other UEs. The uplink signaling component 725 may transmit the unencoded uplink signal on the uplink resources allocated by the first resource allocation message according to an over-the-air computation operation.

In some examples, the uplink resource component 730 may identify uplink resources allocated by a configured grant, where the first resource allocation message indicates an activation or a deactivation of the uplink resources allocated by the configured grant. The uplink signaling priority component 735 may transmit the unencoded uplink signal on the uplink resources based on a priority of the unencoded uplink signal relative to other uplink signaling for the UE.

In some examples, the uplink signaling priority component 735 may identify overlapping time-frequency resources for transmission of the unencoded uplink signal and the other uplink signaling.

In some examples, the uplink signaling priority component 735 may determine that the transmission of the unencoded uplink signal has a default lower priority than the other uplink signaling. In some examples, the uplink signaling priority component 735 may receive an indication of the priority of the unencoded uplink signal.

The uplink signaling repetition component 740 may determine, based on the first RNTI, that the first resource allocation message schedules a transmission of one or more repetitions of the unencoded uplink signal on one or more uplink resources of the allocated uplink resources. In some examples, the uplink signaling repetition component 740 may determine that the one or more uplink resources include a number of configured grant physical uplink shared channel resources.

In some examples, the uplink signaling repetition component 740 may transmit the one or more repetitions of the unencoded uplink signal on the number of configured grant physical uplink shared channel resources based on the resource allocation message. In some examples, the uplink signaling repetition component 740 may determine that the one or more uplink resources include different frequency-domain resources of a physical uplink shared channel. In some examples, the uplink signaling repetition component 740 may transmit the one or more repetitions on the different frequency-domain resources of the physical uplink shared channel based on the resource allocation message. In some examples, the uplink signaling repetition component 740 may configure a time gap between the one or more repetitions based on a channel fading value associated with the transmission of the unencoded uplink signal. In some cases, the first resource allocation message includes DCI, a HARQ process identification (ID), a NDI, or any combination thereof.

Figure 8:
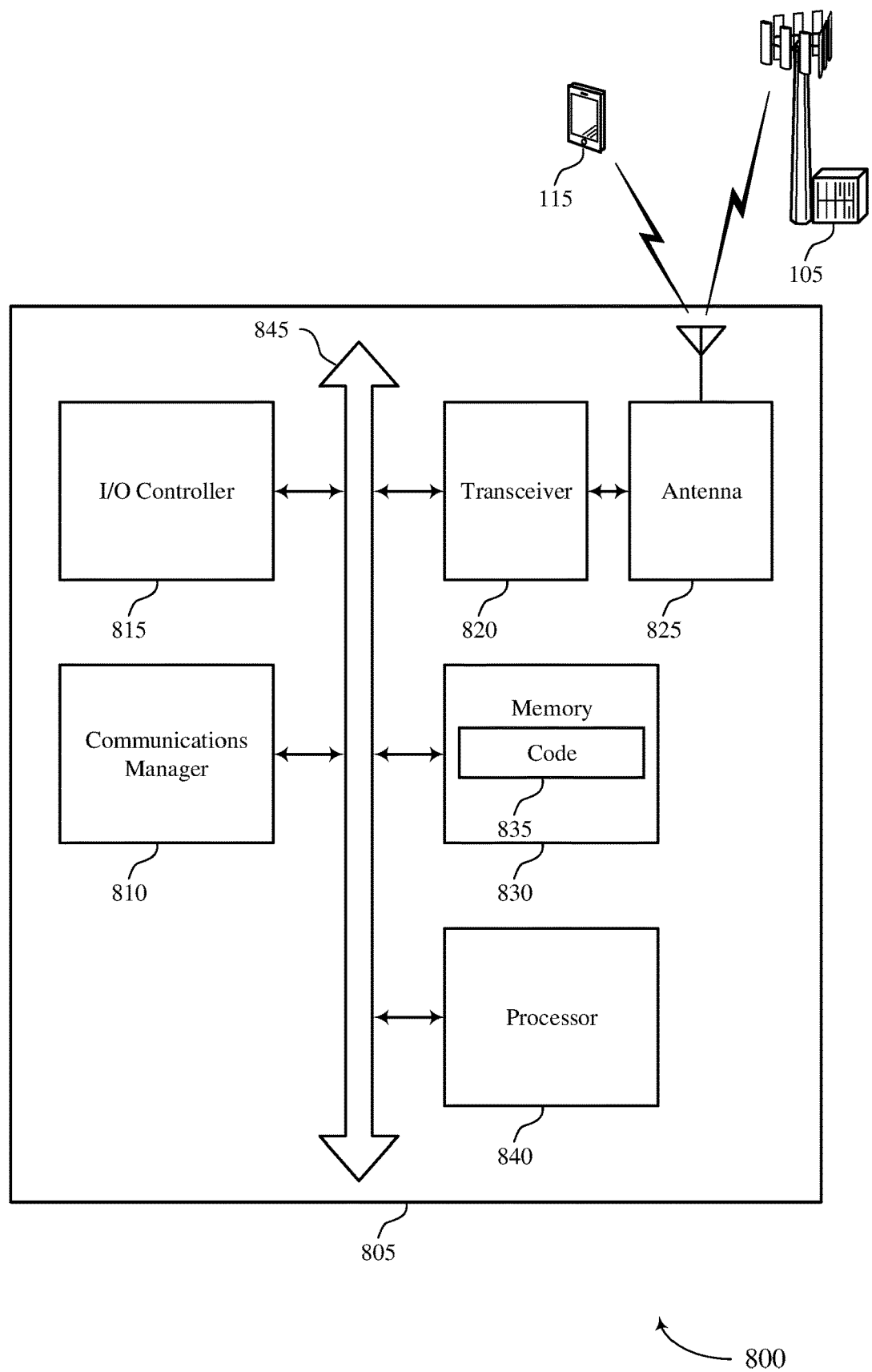
FIG. 8 shows a diagram of a system including a device that supports resource allocation for over-the-air model aggregation in federated learning in accordance with aspects of the present disclosure.

FIG. 8 shows a diagram of a system 800 including a device 805 that supports resource allocation for over-the-air model aggregation in federated learning in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a first radio network temporary identifier (RNTI) associated with decoding a first resource allocation message that allocates uplink resources for transmission of an unencoded uplink signal, the first RNTI being different from one or more other RNTIs configured for the UE, decode the first resource allocation message using the first RNTI, apply analog modulation and pre-equalization parameters to a data block to form the unencoded uplink signal, where the uplink resources allocated by the first resource allocation message overlap with transmissions of one or more other UEs, and transmit the unencoded uplink signal on the uplink resources allocated by the first resource allocation message according to an over-the-air computation operation.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource allocation for over-the-air model aggregation in federated learning).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
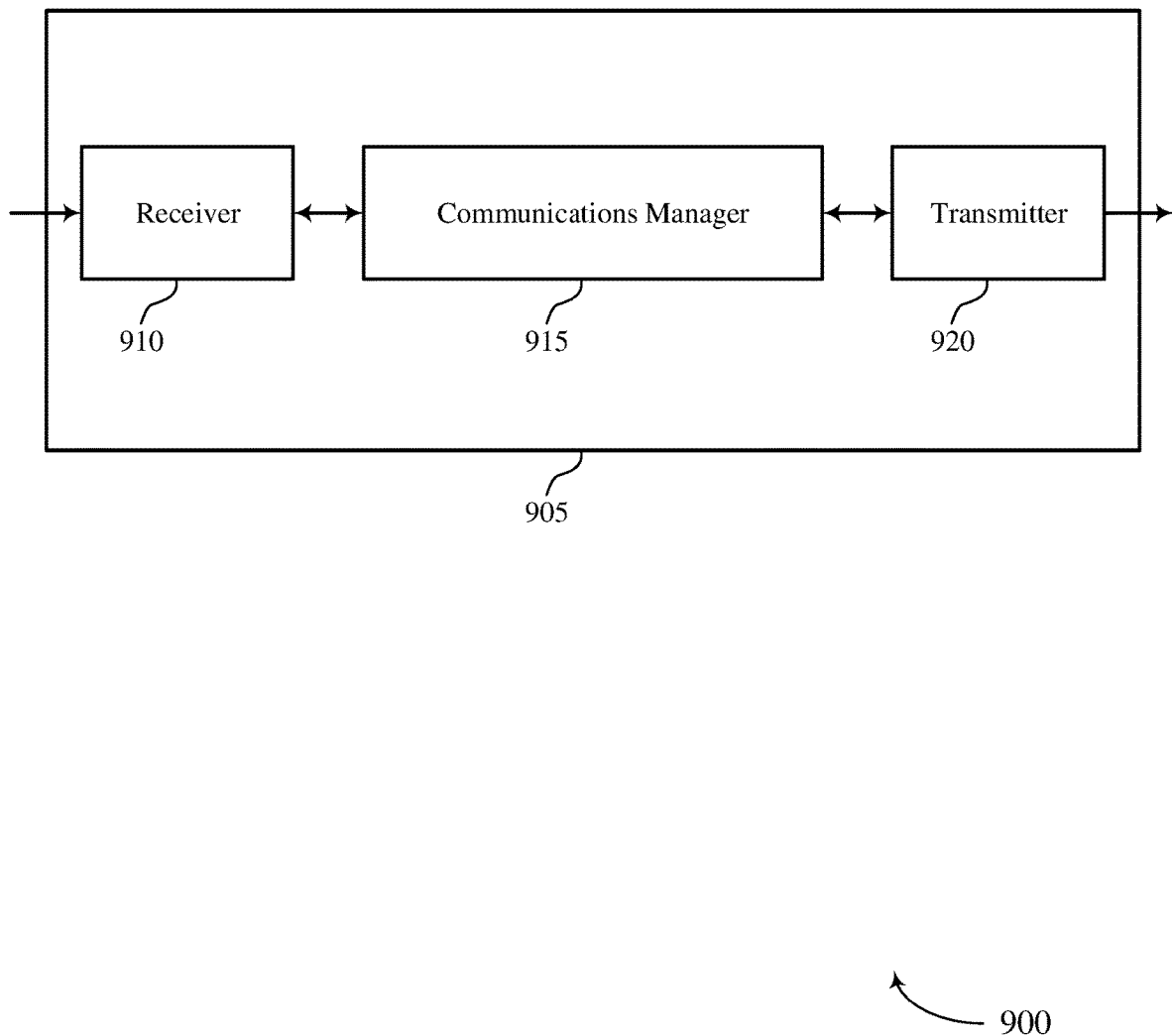
FIGS. 9 and 10 show block diagrams of devices that support resource allocation for over-the-air model aggregation in federated learning in accordance with aspects of the present disclosure.

FIG. 9 shows a block diagram 900 of a device 905 that supports resource allocation for over-the-air model aggregation in federated learning in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource allocation for over-the-air model aggregation in federated learning, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a first radio network temporary identifier (RNTI) associated with decoding a first resource allocation message that allocates uplink resources for a transmission of an unencoded uplink signal, the first RNTI being different from one or more other RNTIs transmitted to the UE, transmit the first resource allocation message based on the transmission of the first RNTI, where the uplink resources allocated by the first resource allocation message include overlapping resources, and receive the unencoded uplink signal on the uplink resources allocated by the first resource allocation message according to an over-the-air computation operation. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, communications manager 915 may be implemented as an integrated circuit or chipset for a mobile device modem, and the receiver 910 and transmitter 920 may be implemented as analog components (e.g., amplifiers, filters, and antennas) coupled with the mobile device modem to enable wireless transmission and reception.

The communications manager 915 as described herein may be implemented to realize one or more potential advantages. At least one implementation may enable communications manager 915 to effectively identify resources for transmission of federated learning model parameters or gradients from a device 905. In some other implementations, the communications manager 915 may determine the priority of such model parameter transmissions, along with other frequency diversity techniques to reduce channel fading for shared channels supporting unencoded signaling.

Based on implementing the rateless encoding techniques as described herein, one or more processors of the device 905 (e.g., processor(s) controlling or incorporated with one or more of receiver 910, communications manager 915, and transmitter 920) may increase the throughput and reduce the latency associated with coordinated uplink transmissions by multiple UEs in the context of over-the-air computation operations. The increase in communication quality and data throughput may result in increased link performance due to the resource allocation techniques. In addition, the resource allocation techniques associated with the over-the-air computation may increase privacy from transmitting devices at the receiving device.

Figure 10:
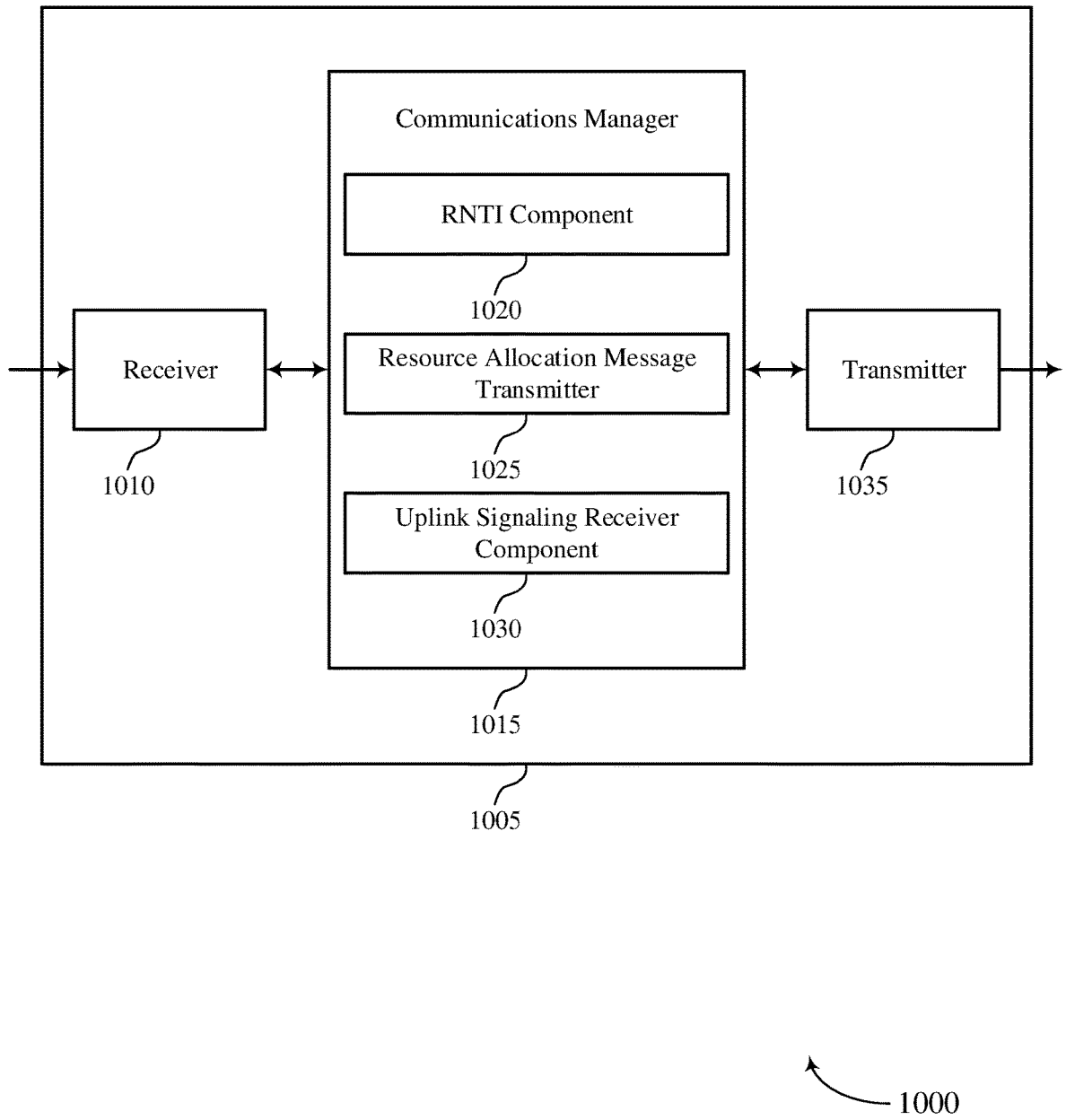

FIG. 10 shows a block diagram 1000 of a device 1005 that supports resource allocation for over-the-air model aggregation in federated learning in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to resource allocation for over-the-air model aggregation in federated learning, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a RNTI component 1020, a resource allocation message transmitter 1025, and an uplink signaling receiver component 1030. The communications manager 1015 may be an example of aspects of the communications manager 1210 described herein.

The RNTI component 1020 may transmit, to a UE, a first radio network temporary identifier (RNTI) associated with decoding a first resource allocation message that allocates uplink resources for a transmission of an unencoded uplink signal, the first RNTI being different from one or more other RNTIs transmitted to the UE.

The resource allocation message transmitter 1025 may transmit the first resource allocation message based on the transmission of the first RNTI, where the uplink resources allocated by the first resource allocation message include overlapping resources.

The uplink signaling receiver component 1030 may receive the unencoded uplink signal on the uplink resources allocated by the first resource allocation message according to an over-the-air computation operation.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
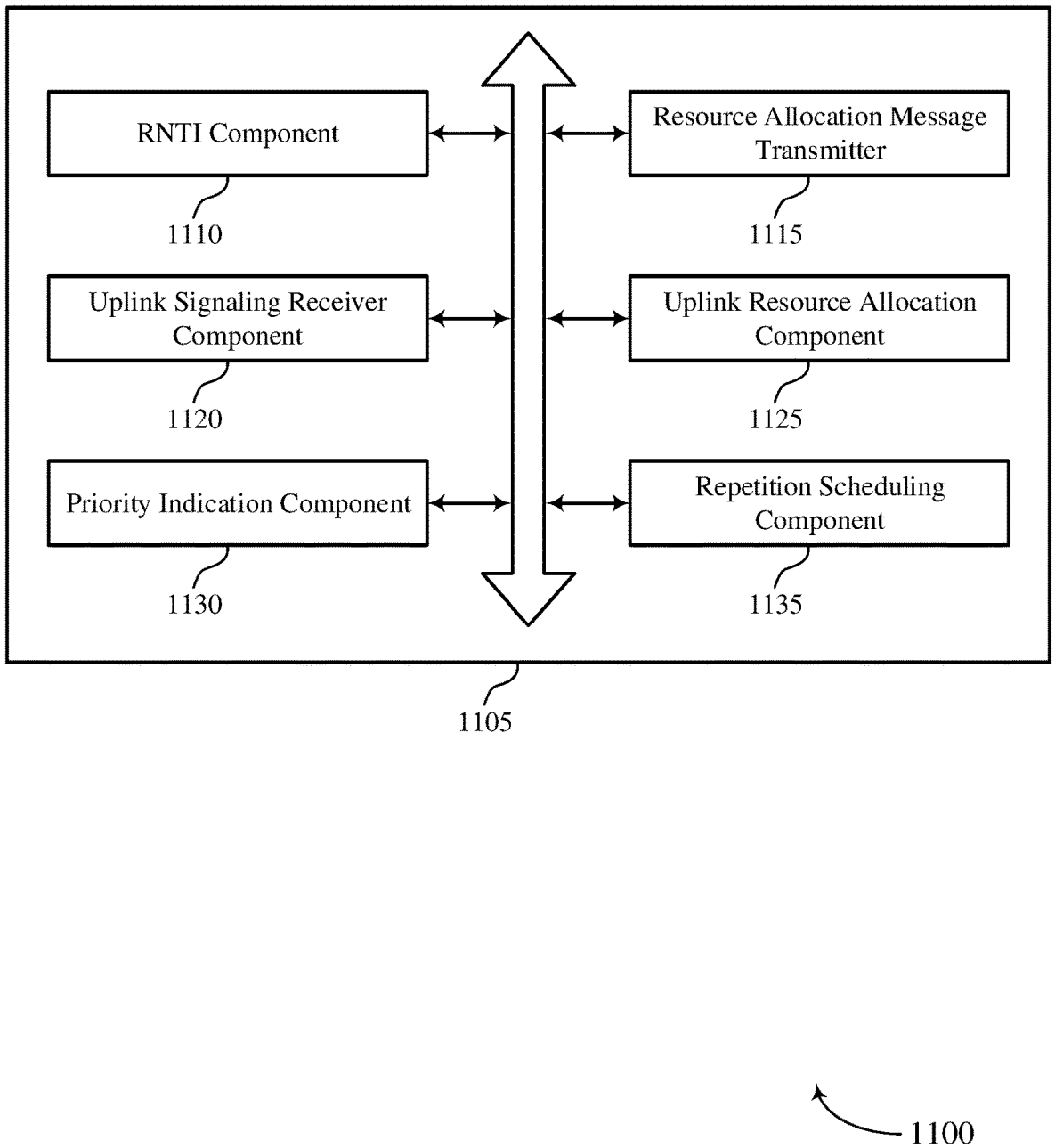
FIG. 11 shows a block diagram of a communications manager that supports resource allocation for over-the-air model aggregation in federated learning in accordance with aspects of the present disclosure.

FIG. 11 shows a block diagram 1100 of a communications manager 1105 that supports resource allocation for over-the-air model aggregation in federated learning in accordance with aspects of the present disclosure. The communications manager 1105 may be an example of aspects of a communications manager 915, a communications manager 1015, or a communications manager 1210 described herein. The communications manager 1105 may include a RNTI component 1110, a resource allocation message transmitter 1115, an uplink signaling receiver component 1120, an uplink resource allocation component 1125, a priority indication component 1130, and a repetition scheduling component 1135. Each of these modules may communicate, directly or indirectly, with one another (e.g., via one or more buses).

The RNTI component 1110 may transmit, to a UE, a first radio network temporary identifier (RNTI) associated with decoding a first resource allocation message that allocates uplink resources for a transmission of an unencoded uplink signal, the first RNTI being different from one or more other RNTIs transmitted to the UE.

The resource allocation message transmitter 1115 may transmit the first resource allocation message based on the transmission of the first RNTI, where the uplink resources allocated by the first resource allocation message include overlapping resources.

In some examples, the resource allocation message transmitter 1115 may transmit the first resource allocation message as a DCI message or a field contained in a DCI message.

The uplink signaling receiver component 1120 may receive the unencoded uplink signal on the uplink resources allocated by the first resource allocation message according to an over-the-air computation operation.

In some examples, the uplink signaling receiver component 1120 may receive the unencoded uplink signal on the uplink resources based on a priority of the unencoded uplink signal relative to other uplink signaling for the UE.

The uplink resource allocation component 1125 may dynamically allocate uplink shared channel resources based on the first resource allocation message.

In some examples, the uplink resource allocation component 1125 may allocate uplink resources in a configured grant, where the first resource allocation message indicates an activation or a deactivation of the uplink resources allocated by the configured grant.

The priority indication component 1130 may identify overlapping time-frequency resources for transmission of the unencoded uplink signal and the other uplink signaling.

In some examples, the priority indication component 1130 may determine that the transmission of the unencoded uplink signal has a default lower priority than the other uplink signaling.

In some examples, the priority indication component 1130 may transmit an indication of the priority of the unencoded uplink signal.

The repetition scheduling component 1135 may schedule, via the first resource allocation message, a transmission of one or more repetitions of the unencoded uplink signal on one or more uplink resources of the allocated uplink resources based on the first RNTI.

In some examples, the repetition scheduling component 1135 may allocate, to the UE, one or more uplink resources as a number of configured grant physical uplink shared channel resources.

In some examples, the repetition scheduling component 1135 may receive the one or more repetitions of the unencoded uplink signal on the number of configured grant physical uplink shared channel resources based on the first resource allocation message.

In some examples, the repetition scheduling component 1135 may allocate, to the UE, one or more different frequency-domain resources of a physical uplink shared channel.

In some examples, the repetition scheduling component 1135 may receive the one or more repetitions on the different frequency-domain resources of the physical uplink shared channel based on the resource allocation message.

In some examples, the repetition scheduling component 1135 may configure a time gap between the one or more repetitions based on a channel fading value associated with the transmission of the unencoded uplink signal.

In some cases, the first resource allocation message includes DCI, a HARQ process identification (ID), a NDI, or any combination thereof.

Figure 12:
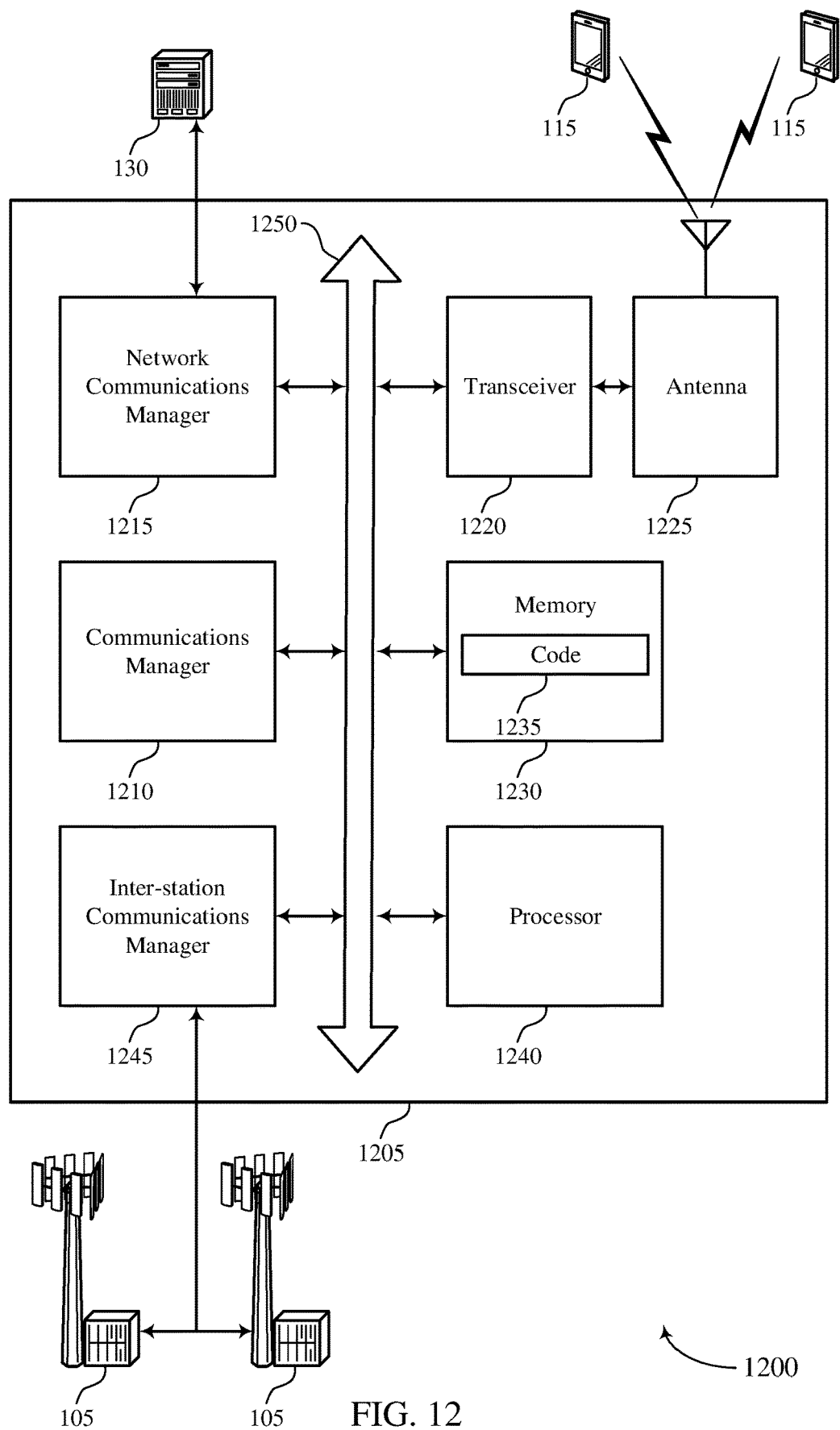
FIG. 12 shows a diagram of a system including a device that supports resource allocation for over-the-air model aggregation in federated learning in accordance with aspects of the present disclosure.

FIG. 12 shows a diagram of a system 1200 including a device 1205 that supports resource allocation for over-the-air model aggregation in federated learning in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a first radio network temporary identifier (RNTI) associated with decoding a first resource allocation message that allocates uplink resources for a transmission of an unencoded uplink signal, the first RNTI being different from one or more other RNTIs transmitted to the UE, transmit the first resource allocation message based on the transmission of the first RNTI, where the uplink resources allocated by the first resource allocation message include overlapping resources, and receive the unencoded uplink signal on the uplink resources allocated by the first resource allocation message according to an over-the-air computation operation.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting resource allocation for over-the-air model aggregation in federated learning).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
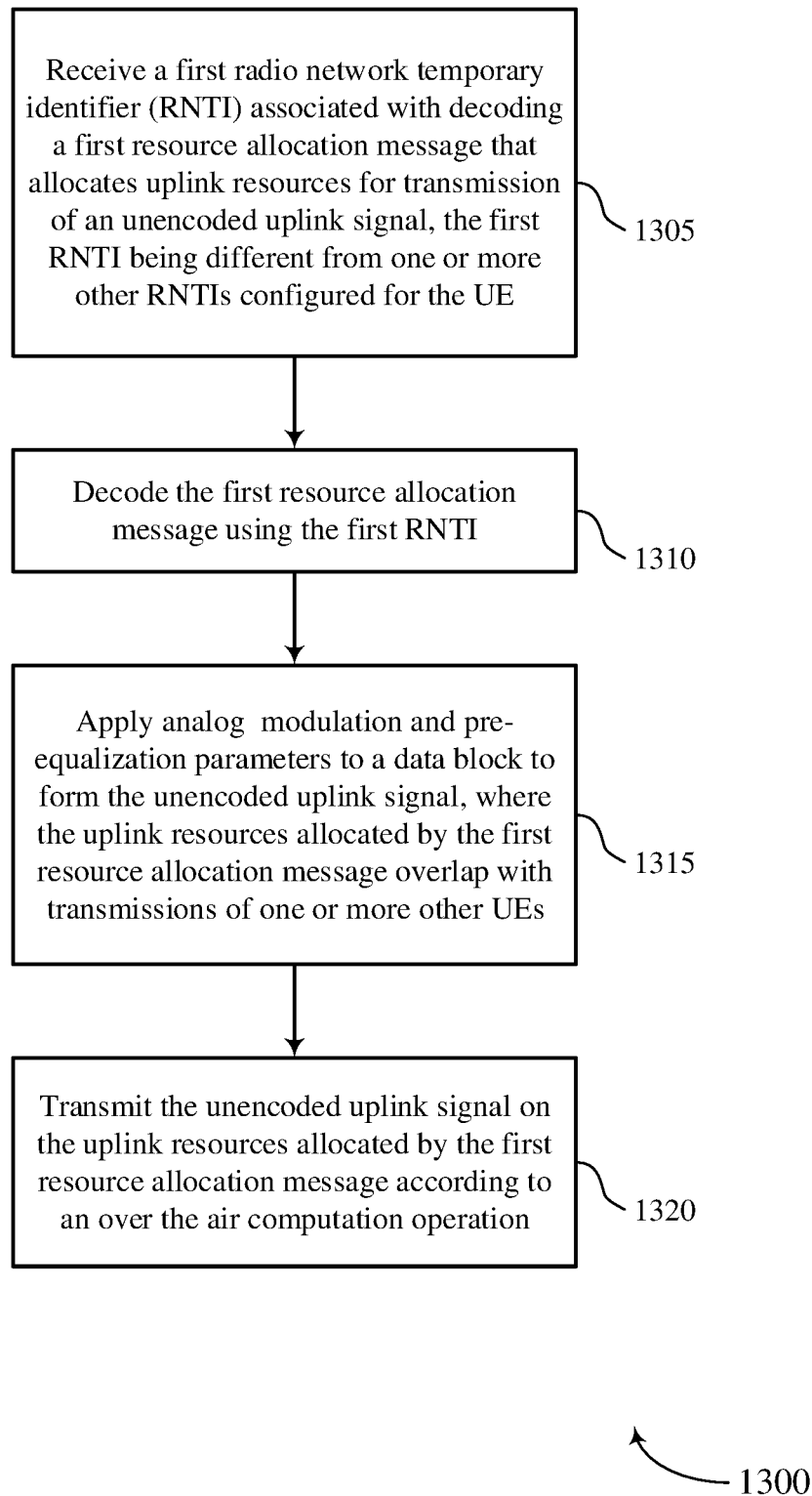
FIGS. 13 through 17 show flowcharts illustrating methods that support resource allocation for over-the-air model aggregation in federated learning in accordance with aspects of the present disclosure.

FIG. 13 shows a flowchart illustrating a method 1300 that supports resource allocation for over-the-air model aggregation in federated learning in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a first radio network temporary identifier (RNTI) associated with decoding a first resource allocation message that allocates uplink resources for transmission of an unencoded uplink signal, the first RNTI being different from one or more other RNTIs configured for the UE. The operations of 1305 may be performed according to the methods described herein. In some examples, aspects of the operations of 1305 may be performed by a RNTI component as described with reference to FIGS. 5 through 8.

At 1310, the UE may decode the first resource allocation message using the first RNTI. The operations of 1310 may be performed according to the methods described herein. In some examples, aspects of the operations of 1310 may be performed by a resource allocation message receiver as described with reference to FIGS. 5 through 8.

At 1315, the UE may apply analog modulation and pre-equalization parameters to a data block to form the unencoded uplink signal, where the uplink resources allocated by the first resource allocation message overlap with transmissions of one or more other UEs. The operations of 1315 may be performed according to the methods described herein. In some examples, aspects of the operations of 1315 may be performed by a pre-equalization parameter component as described with reference to FIGS. 5 through 8.

At 1320, the UE may transmit the unencoded uplink signal on the uplink resources allocated by the first resource allocation message according to an over-the-air computation operation. The operations of 1320 may be performed according to the methods described herein. In some examples, aspects of the operations of 1320 may be performed by an uplink signaling component as described with reference to FIGS. 5 through 8.

Figure 14:
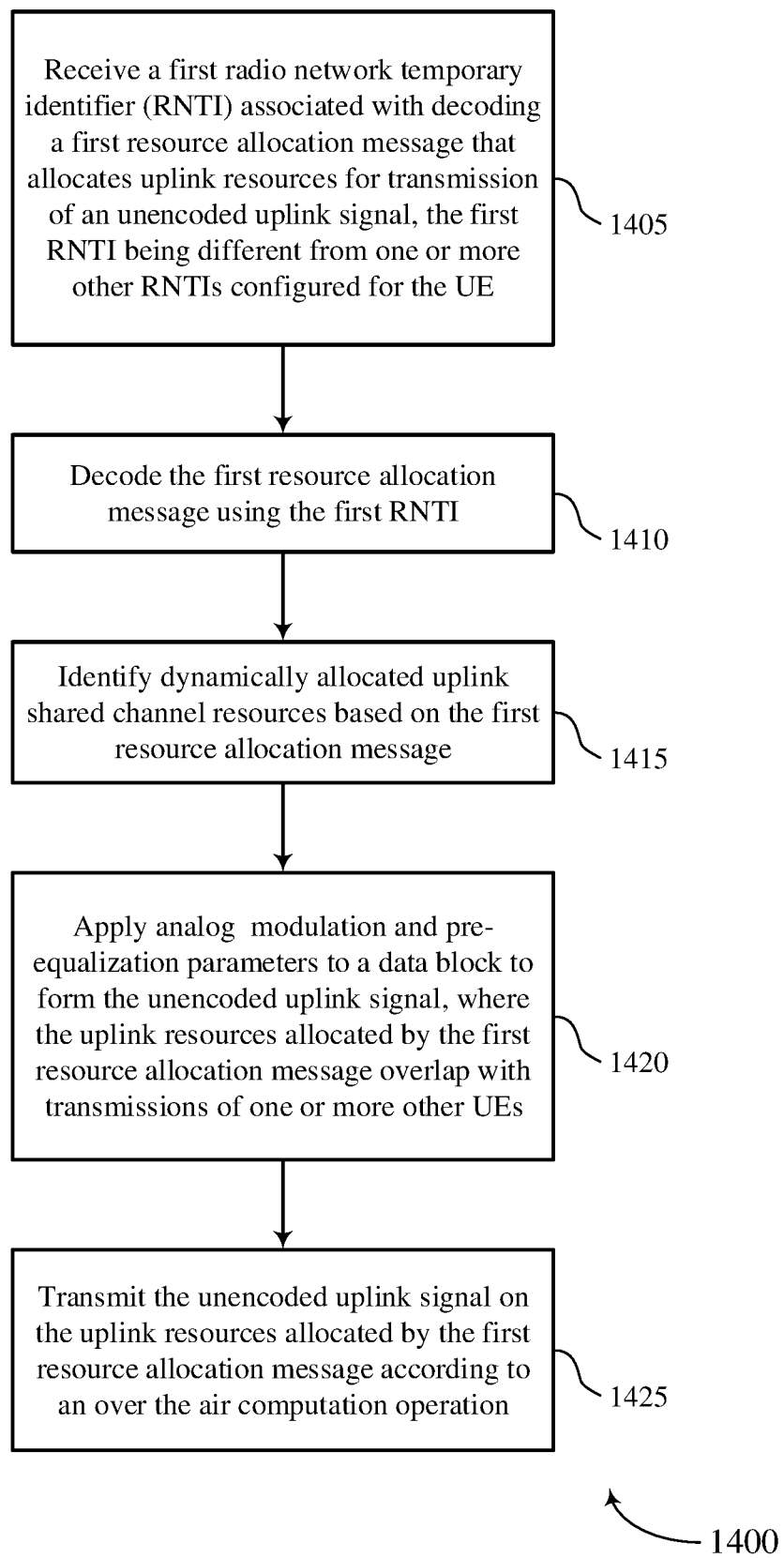

FIG. 14 shows a flowchart illustrating a method 1400 that supports resource allocation for over-the-air model aggregation in federated learning in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a first radio network temporary identifier (RNTI) associated with decoding a first resource allocation message that allocates uplink resources for transmission of an unencoded uplink signal, the first RNTI being different from one or more other RNTIs configured for the UE. The operations of 1405 may be performed according to the methods described herein. In some examples, aspects of the operations of 1405 may be performed by a RNTI component as described with reference to FIGS. 5 through 8.

At 1410, the UE may decode the first resource allocation message using the first RNTI. The operations of 1410 may be performed according to the methods described herein. In some examples, aspects of the operations of 1410 may be performed by a resource allocation message receiver as described with reference to FIGS. 5 through 8.

At 1415, the UE may identify dynamically allocated uplink shared channel resources based on the first resource allocation message. The operations of 1415 may be performed according to the methods described herein. In some examples, aspects of the operations of 1415 may be performed by an uplink resource component as described with reference to FIGS. 5 through 8.

At 1420, the UE may apply analog modulation and pre-equalization parameters to a data block to form the unencoded uplink signal, where the uplink resources allocated by the first resource allocation message overlap with transmissions of one or more other UEs. The operations of 1420 may be performed according to the methods described herein. In some examples, aspects of the operations of 1420 may be performed by a pre-equalization parameter component as described with reference to FIGS. 5 through 8.

At 1425, the UE may transmit the unencoded uplink signal on the uplink resources allocated by the first resource allocation message according to an over-the-air computation operation. The operations of 1425 may be performed according to the methods described herein. In some examples, aspects of the operations of 1425 may be performed by an uplink signaling component as described with reference to FIGS. 5 through 8.

Figure 15:
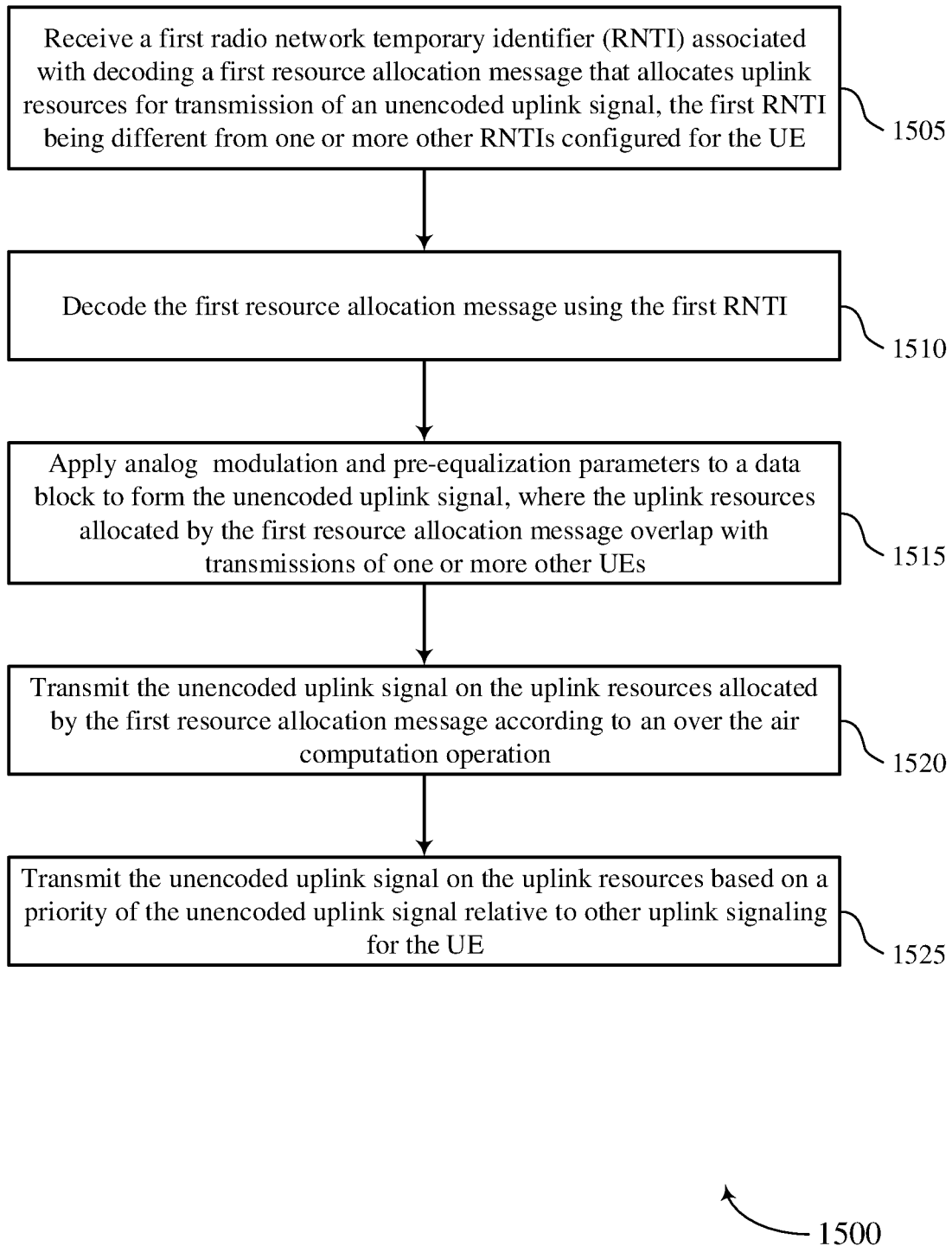

FIG. 15 shows a flowchart illustrating a method 1500 that supports resource allocation for over-the-air model aggregation in federated learning in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a first radio network temporary identifier (RNTI) associated with decoding a first resource allocation message that allocates uplink resources for transmission of an unencoded uplink signal, the first RNTI being different from one or more other RNTIs configured for the UE. The operations of 1505 may be performed according to the methods described herein. In some examples, aspects of the operations of 1505 may be performed by a RNTI component as described with reference to FIGS. 5 through 8.

At 1510, the UE may decode the first resource allocation message using the first RNTI. The operations of 1510 may be performed according to the methods described herein. In some examples, aspects of the operations of 1510 may be performed by a resource allocation message receiver as described with reference to FIGS. 5 through 8.

At 1515, the UE may apply analog modulation and pre-equalization parameters to a data block to form the unencoded uplink signal, where the uplink resources allocated by the first resource allocation message overlap with transmissions of one or more other UEs. The operations of 1515 may be performed according to the methods described herein. In some examples, aspects of the operations of 1515 may be performed by a pre-equalization parameter component as described with reference to FIGS. 5 through 8.

At 1520, the UE may transmit the unencoded uplink signal on the uplink resources allocated by the first resource allocation message according to an over-the-air computation operation. The operations of 1520 may be performed according to the methods described herein. In some examples, aspects of the operations of 1520 may be performed by an uplink signaling component as described with reference to FIGS. 5 through 8.

At 1525, the UE may transmit the unencoded uplink signal on the uplink resources based on a priority of the unencoded uplink signal relative to other uplink signaling for the UE. The operations of 1525 may be performed according to the methods described herein. In some examples, aspects of the operations of 1525 may be performed by an uplink signaling priority component as described with reference to FIGS. 5 through 8.

Figure 16:
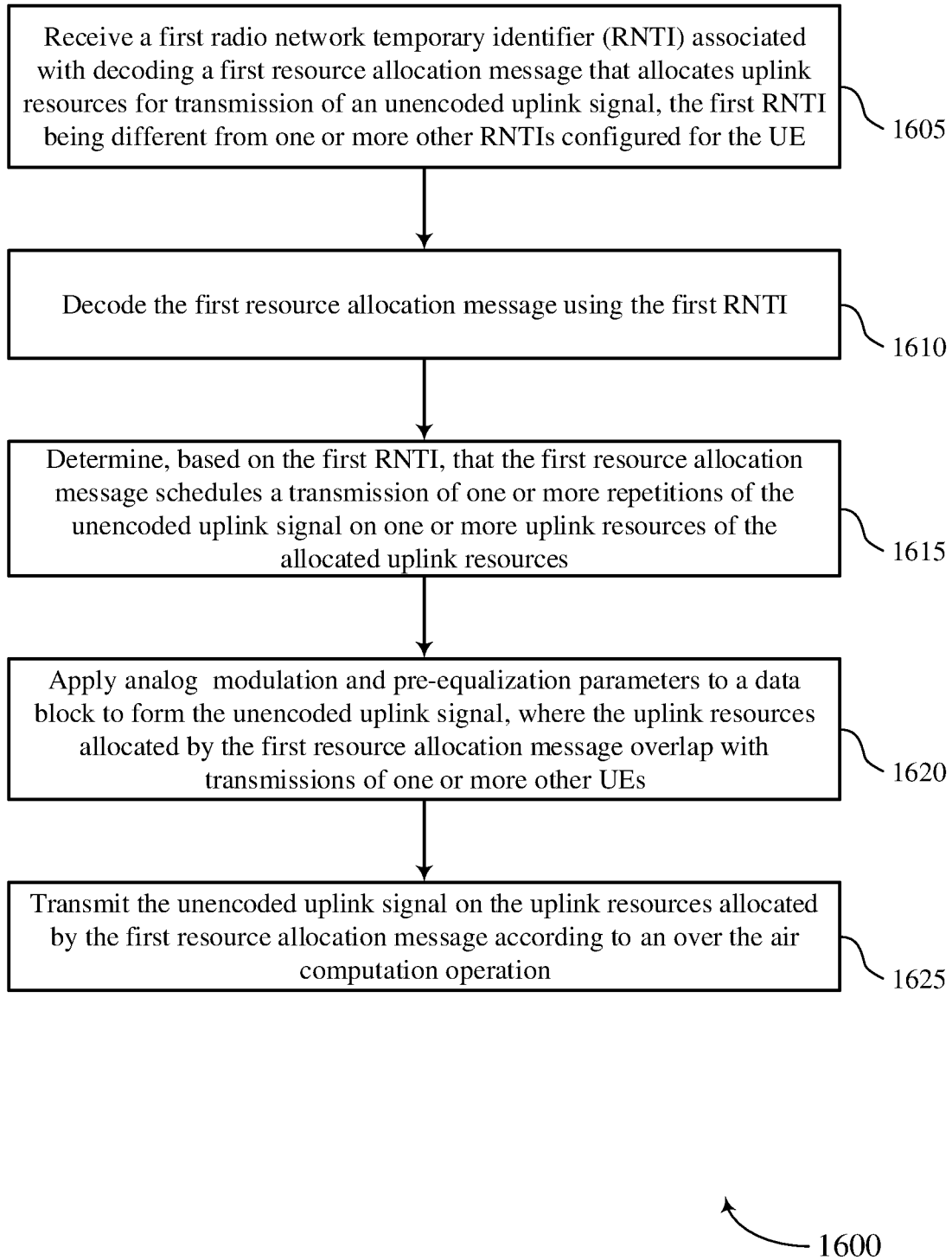

FIG. 16 shows a flowchart illustrating a method 1600 that supports resource allocation for over-the-air model aggregation in federated learning in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive a first radio network temporary identifier (RNTI) associated with decoding a first resource allocation message that allocates uplink resources for transmission of an unencoded uplink signal, the first RNTI being different from one or more other RNTIs configured for the UE. The operations of 1605 may be performed according to the methods described herein. In some examples, aspects of the operations of 1605 may be performed by a RNTI component as described with reference to FIGS. 5 through 8.

At 1610, the UE may decode the first resource allocation message using the first RNTI. The operations of 1610 may be performed according to the methods described herein. In some examples, aspects of the operations of 1610 may be performed by a resource allocation message receiver as described with reference to FIGS. 5 through 8.

At 1615, the UE may determine, based on the first RNTI, that the first resource allocation message schedules a transmission of one or more repetitions of the unencoded uplink signal on one or more uplink resources of the allocated uplink resources. The operations of 1615 may be performed according to the methods described herein. In some examples, aspects of the operations of 1615 may be performed by an uplink signaling repetition component as described with reference to FIGS. 5 through 8.

At 1620, the UE may apply analog modulation and pre-equalization parameters to a data block to form the unencoded uplink signal, where the uplink resources allocated by the first resource allocation message overlap with transmissions of one or more other UEs. The operations of 1620 may be performed according to the methods described herein. In some examples, aspects of the operations of 1620 may be performed by a pre-equalization parameter component as described with reference to FIGS. 5 through 8.

At 1625, the UE may transmit the unencoded uplink signal on the uplink resources allocated by the first resource allocation message according to an over-the-air computation operation. The operations of 1625 may be performed according to the methods described herein. In some examples, aspects of the operations of 1625 may be performed by an uplink signaling component as described with reference to FIGS. 5 through 8.

Figure 17:
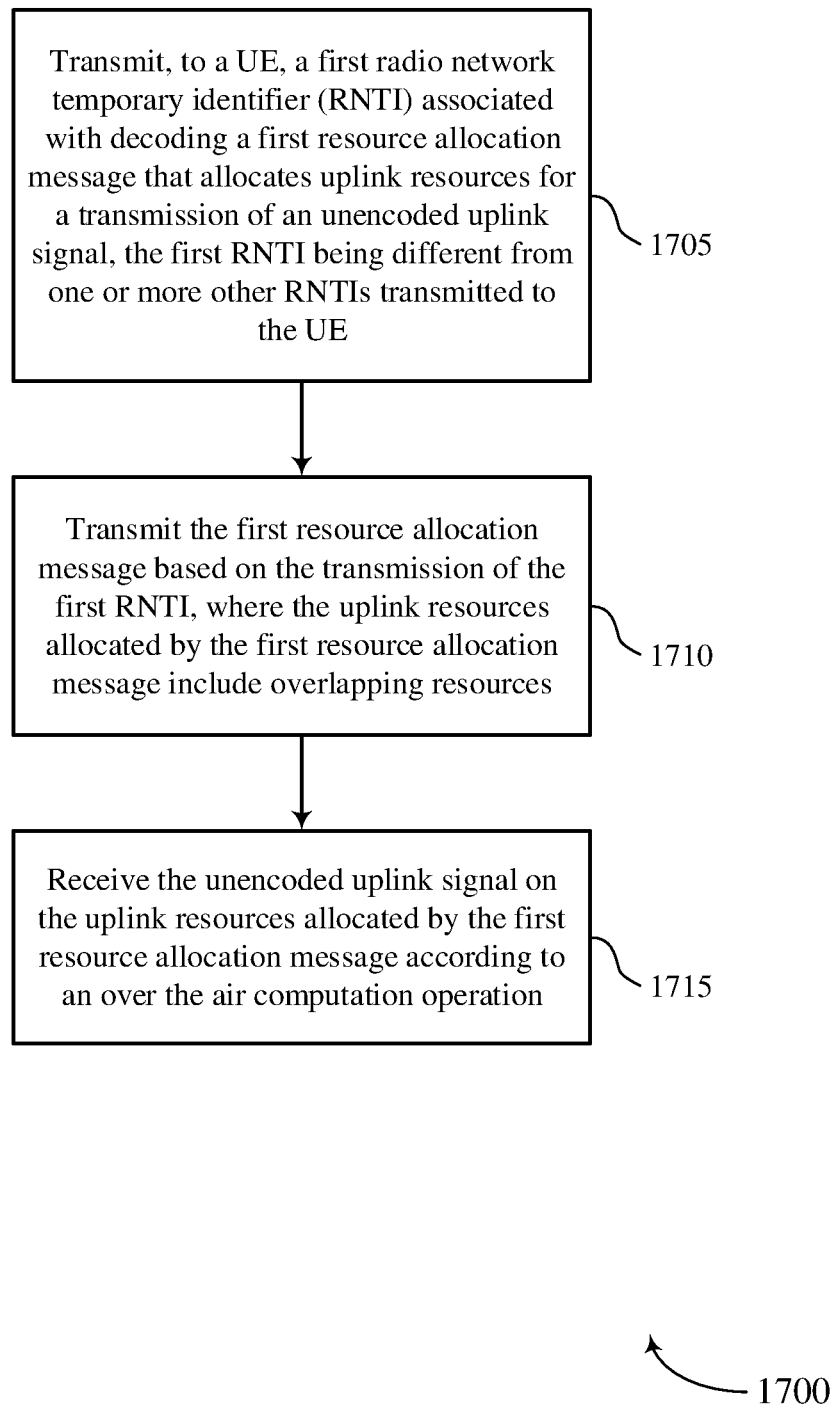

FIG. 17 shows a flowchart illustrating a method 1700 that supports resource allocation for over-the-air model aggregation in federated learning in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a first radio network temporary identifier (RNTI) associated with decoding a first resource allocation message that allocates uplink resources for a transmission of an unencoded uplink signal, the first RNTI being different from one or more other RNTIs transmitted to the UE. The operations of 1705 may be performed according to the methods described herein. In some examples, aspects of the operations of 1705 may be performed by a RNTI component as described with reference to FIGS. 9 through 12.

At 1710, the base station may transmit the first resource allocation message based on the transmission of the first RNTI, where the uplink resources allocated by the first resource allocation message include overlapping resources. The operations of 1710 may be performed according to the methods described herein. In some examples, aspects of the operations of 1710 may be performed by a resource allocation message transmitter as described with reference to FIGS. 9 through 12.

At 1715, the base station may receive the unencoded uplink signal on the uplink resources allocated by the first resource allocation message according to an over-the-air computation operation. The operations of 1715 may be performed according to the methods described herein. In some examples, aspects of the operations of 1715 may be performed by an uplink signaling receiver component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving a first radio network temporary identifier (RNTI) associated with decoding a first resource allocation message that allocates uplink resources for transmission of an unencoded uplink signal, the first RNTI being different from one or more other RNTIs configured for the UE;
   decoding the first resource allocation message using the first RNTI;
   applying analog modulation and pre-equalization parameters to a data block to form the unencoded uplink signal, wherein the uplink resources allocated by the first resource allocation message overlap with transmissions of one or more other UEs; and
   transmitting the unencoded uplink signal on the uplink resources allocated by the first resource allocation message according to an over-the-air computation operation.

2. The method of claim 1, wherein decoding the first resource allocation message using the first RNTI further comprises:
   identifying dynamically allocated uplink shared channel resources based at least in part on the first resource allocation message.

3. The method of claim 1, wherein decoding the first resource allocation message using the first RNTI further comprises:
   identifying uplink resources allocated by a configured grant, wherein the first resource allocation message indicates an activation or a deactivation of the uplink resources allocated by the configured grant.

4. The method of claim 1, wherein transmitting the unencoded uplink signal on the uplink resources allocated by the first resource allocation message further comprises:
   transmitting the unencoded uplink signal on the uplink resources based at least in part on a priority of the unencoded uplink signal relative to other uplink signaling for the UE.

5. The method of claim 4, further comprising:
   identifying overlapping time-frequency resources for transmission of the unencoded uplink signal and the other uplink signaling; and
   determining that the transmission of the unencoded uplink signal has a default lower priority than the other uplink signaling.

6. The method of claim 4, further comprising:
   receiving an indication of the priority of the unencoded uplink signal.

7. The method of claim 1, further comprising:
   determining, based at least in part on the first RNTI, that the first resource allocation message schedules a transmission of one or more repetitions of the unencoded uplink signal on one or more uplink resources of the allocated uplink resources.

8. The method of claim 7, wherein the first resource allocation message comprises downlink control information (DCI), a hybrid automatic repeat request (HARQ) process identification (ID), a new data indicator (NDI), or any combination thereof.

9. The method of claim 7, further comprising:
   determining that the one or more uplink resources comprise a number of configured grant physical uplink shared channel resources; and
   transmitting the one or more repetitions of the unencoded uplink signal on the number of configured grant physical uplink shared channel resources based at least in part on the resource allocation message.

10. The method of claim 7, further comprising:
    determining that the one or more uplink resources comprise different frequency-domain resources of a physical uplink shared channel; and
    transmitting the one or more repetitions on the different frequency-domain resources of the physical uplink shared channel based at least in part on the resource allocation message.

11. The method of claim 7, further comprising:
    configuring a time gap between the one or more repetitions based at least in part on a channel fading value associated with the transmission of the unencoded uplink signal.

12. The method of claim 1, further comprising:
    receiving the first resource allocation message as a downlink control information (DCI) message or a field contained in a DCI message.

13. An apparatus for wireless communications at a first user equipment (UE), comprising:
    a processor,
    memory coupled with the processor; and
    instructions stored in the memory and executable by the processor to cause the apparatus to:

receive a first radio network temporary identifier (RNTI) associated with decoding a first resource allocation message that allocates uplink resources for transmission of an unencoded uplink signal, the first RNTI being different from one or more other RNTIs configured for the UE;

decode the first resource allocation message using the first RNTI;

apply analog modulation and pre-equalization parameters to a data block to form the unencoded uplink signal, wherein the uplink resources allocated by the first resource allocation message overlap with transmissions of one or more other UEs; and transmit the unencoded uplink signal on the uplink resources allocated by the first resource allocation message according to an over-the-air computation operation.

14. The apparatus of claim 13, wherein the instructions to decode the first resource allocation message using the first RNTI further are executable by the processor to cause the apparatus to:

identify dynamically allocated uplink shared channel resources based at least in part on the first resource allocation message.

15. The apparatus of claim 13, wherein the instructions to decode the first resource allocation message using the first RNTI further are executable by the processor to cause the apparatus to:

identify uplink resources allocated by a configured grant, wherein the first resource allocation message indicates an activation or a deactivation of the uplink resources allocated by the configured grant.

16. The apparatus of claim 13, wherein the instructions to transmit the unencoded uplink signal on the uplink resources allocated by the first resource allocation message further are executable by the processor to cause the apparatus to:

transmit the unencoded uplink signal on the uplink resources based at least in part on a priority of the unencoded uplink signal relative to other uplink signaling for the UE.

17. The apparatus of claim 16, wherein the instructions are further executable by the processor to cause the apparatus to:

identify overlapping time-frequency resources for transmission of the unencoded uplink signal and the other uplink signaling; and determine that the transmission of the unencoded uplink signal has a default lower priority than the other uplink signaling.

18. The apparatus of claim 16, wherein the instructions are further executable by the processor to cause the apparatus to:

receive an indication of the priority of the unencoded uplink signal.

19. The apparatus of claim 13, wherein the instructions are further executable by the processor to cause the apparatus to:

determine, based at least in part on the first RNTI, that the first resource allocation message schedules a transmission of one or more repetitions of the unencoded uplink signal on one or more uplink resources of the allocated uplink resources.

20. The apparatus of claim 19, wherein the first resource allocation message comprises downlink control information (DCI), a hybrid automatic repeat request (HARQ) process identification (ID), a new data indicator (NDI), or any combination thereof.

21. The apparatus of claim 19, wherein the instructions are further executable by the processor to cause the apparatus to:

determine that the one or more uplink resources comprise a number of configured grant physical uplink shared channel resources; and transmit the one or more repetitions of the unencoded uplink signal on the number of configured grant physical uplink shared channel resources based at least in part on the resource allocation message.

22. The apparatus of claim 19, wherein the instructions are further executable by the processor to cause the apparatus to:

determine that the one or more uplink resources comprise different frequency-domain resources of a physical uplink shared channel; and transmit the one or more repetitions on the different frequency-domain resources of the physical uplink shared channel based at least in part on the resource allocation message.

23. The apparatus of claim 19, wherein the instructions are further executable by the processor to cause the apparatus to:

configure a time gap between the one or more repetitions based at least in part on a channel fading value associated with the transmission of the unencoded uplink signal.

24. The apparatus of claim 13, wherein the instructions are further executable by the processor to cause the apparatus to:

receive the first resource allocation message as a downlink control information (DCI) message or a field contained in a DCI message.

25. An apparatus for wireless communications at a base station, comprising:

a processor, memory coupled with the processor; and instructions stored in the memory and executable by the processor to cause the apparatus to:

transmit, to a user equipment (UE), a first radio network temporary identifier (RNTI) associated with decoding a first resource allocation message that allocates uplink resources for a transmission of an unencoded uplink signal, the first RNTI being different from one or more other RNTIs transmitted to the UE;

transmit the first resource allocation message based at least in part on the transmission of the first RNTI, wherein the uplink resources allocated by the first resource allocation message comprise overlapping resources; and receive the unencoded uplink signal on the uplink resources allocated by the first resource allocation message according to an over-the-air computation operation.

26. The apparatus of claim 25, wherein the instructions to transmit the first resource allocation message associated with the first RNTI further are executable by the processor to cause the apparatus to:

dynamically allocate uplink shared channel resources based at least in part on the first resource allocation message.

27. The apparatus of claim 25, wherein the instructions to transmit the first resource allocation message associated with the first RNTI further are executable by the processor to cause the apparatus to:

allocate uplink resources in a configured grant, wherein the first resource allocation message indicates an activation or a deactivation of the uplink resources allocated by the configured grant.

28. The apparatus of claim 25, wherein the instructions to receive the unencoded uplink signal on the uplink resources allocated by the first resource allocation message further are executable by the processor to cause the apparatus to:

receive the unencoded uplink signal on the uplink resources based at least in part on a priority of the unencoded uplink signal relative to other uplink signaling for the UE.

29. The apparatus of claim 25, wherein the instructions are further executable by the processor to cause the apparatus to:

schedule, via the first resource allocation message, a transmission of one or more repetitions of the unencoded uplink signal on one or more uplink resources of the allocated uplink resources based at least in part on the first RNTI.

30. The apparatus of claim 25, wherein the instructions are further executable by the processor to cause the apparatus to:

transmit the first resource allocation message as a downlink control information (DCI) message or a field contained in a DCI message.

* * * * *